US012173919B2

(12) United States Patent
Yamaguchi et al.

(10) Patent No.: US 12,173,919 B2
(45) Date of Patent: Dec. 24, 2024

(54) AIR-CONDITIONER

(71) Applicants:DAIKIN INDUSTRIES, LTD., Osaka (JP); DAIKIN EUROPE N.V., Ostend (BE)

(72) Inventors: Takahiro Yamaguchi, Ostend (BE); Stefan Vandaele, Ostend (BE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 455 days.

(21) Appl. No.: 17/295,168

(22) PCT Filed: Dec. 5, 2019

(86) PCT No.: PCT/JP2019/047566
§ 371 (c)(1),
(2) Date: May 19, 2021

(87) PCT Pub. No.: WO2020/116551
PCT Pub. Date: Jun. 11, 2020

(65) Prior Publication Data
US 2022/0018571 A1 Jan. 20, 2022

(30) Foreign Application Priority Data

Dec. 7, 2018 (EP) .................................... 18211139
Dec. 7, 2018 (EP) .................................... 18211149
Dec. 7, 2018 (EP) .................................... 18211153

(51) Int. Cl.
*F24F 12/00* (2006.01)
*F24F 11/77* (2018.01)
(Continued)

(52) U.S. Cl.
CPC ............ *F24F 12/003* (2013.01); *F24F 11/77* (2018.01); *F25B 9/008* (2013.01);
(Continued)

(58) Field of Classification Search
CPC .... F24F 12/003; F24F 11/77; F24F 2012/007; F24F 2110/12; F24F 2110/70;
(Continued)

(56) References Cited

U.S. PATENT DOCUMENTS 4,655,278 A 4/1987 Seguin
6,038,879 A * 3/2000 Turcotte .................. F24F 1/022
62/409

(Continued)

FOREIGN PATENT DOCUMENTS

CN 108139124 A 6/2018
EP 0091643 A2 10/1983
(Continued)

OTHER PUBLICATIONS

International Search Report corresponding to International Patent Application No. PCT/JP2019/047566 dated Feb. 19, 2020 (5 pages).

(Continued)

*Primary Examiner* — Nelson J Nieves
*Assistant Examiner* — Matthew John Moscola
(74) *Attorney, Agent, or Firm* — Osha Bergman Watanabe & Burton LLP

(57) ABSTRACT

An air-conditioner includes: a return-air inlet and a supply-air outlet each communicating with a predetermined space; a first main air channel configured to allow air to flow therein towards the supply-air outlet; a first heat exchanger disposed in the first main air channel and that causes heat-exchange between refrigerant flowing therein and air passing therethrough; an exhaust-air outlet communicating with an outside of the predetermined space; a second main air channel configured to allow air to flow therein towards the exhaust-air outlet; a second heat exchanger disposed in the second main air channel and that causes heat-exchange between refrigerant flowing therein and air passing there- (Continued)

through; and an exhaust ventilation channel configured to allow air to flow therein from the return-air inlet towards the exhaust-air outlet.

29 Claims, 22 Drawing Sheets

(51) Int. Cl.
   *F24F 110/12* (2018.01)
   *F24F 110/70* (2018.01)
   *F25B 9/00* (2006.01)
(52) U.S. Cl.
   CPC ..... *F24F 2012/007* (2013.01); *F24F 2110/12* (2018.01); *F24F 2110/70* (2018.01)
(58) Field of Classification Search
   CPC . F24F 1/027; F24F 11/81; F25B 9/008; F25B 49/005; F25B 2313/0231; F25B 2313/0233; F25B 2313/0253; F25B 2313/02743; F25B 13/00; F25B 2500/222; F25B 2600/2525; Y02B 30/52; Y02B 30/70; Y02B 30/56
   See application file for complete search history.

(56) References Cited

U.S. PATENT DOCUMENTS

| | | | |
|---|---|---|---|
| 9,487,059 B2* | 11/2016 | Tabei | B60H 1/00849 |
| 9,989,271 B1* | 6/2018 | Becker | F24F 5/0021 |
| 10,634,367 B2* | 4/2020 | De' Longhi | F25B 40/02 |
| 2005/0051295 A1 | 3/2005 | Yamanaka et al. | |
| 2007/0158049 A1 | 7/2007 | Kim et al. | |
| 2012/0216558 A1* | 8/2012 | Dempsey | F24F 12/003 62/238.7 |
| 2017/0356340 A1* | 12/2017 | Vaisman | F02C 1/10 |
| 2018/0224140 A1* | 8/2018 | Iio | F24F 12/006 |

FOREIGN PATENT DOCUMENTS

| | | |
|---|---|---|
| EP | 2620715 A1 | 7/2013 |
| EP | 2821727 A1 | 1/2015 |
| GB | 2528642 A | 2/2016 |
| JP | 2002-174448 A | 6/2002 |
| JP | 2007-51864 A | 3/2007 |
| WO | 2007/138954 A1 | 12/2007 |
| WO | 2015/173910 A1 | 11/2015 |
| WO | 2017/025877 A1 | 2/2017 |

OTHER PUBLICATIONS

Written Opinion issued in corresponding International Application No. PCT/JP2019/047566 dated Feb. 19, 2020 (9 pages).
Extended European Search Report issued in corresponding European Patent Application No. 18211149.2 dated Jun. 24, 2019 (8 pages).
Extended European Search Report issued in corresponding European Patent Application No. 18211139.3 dated Jun. 14, 2019 (9 pages).
Extended European Search Report issued in corresponding European Patent Application No. 18211153.4 dated Jun. 24, 2019 (8 pages).
International Preliminary Report on Patentability issued in corresponding International Application No. PCT/JP2019/047566 dated Jun. 17, 2021 (11 pages).

* cited by examiner

AIR-CONDITIONER

TECHNICAL FIELD

The present disclosure relates to an air-conditioner.

BACKGROUND

EP 0091643 A2 proposes an air-conditioner having a total heat exchanger configured to cause a heat-exchange between ventilation intake air and ventilation exhaust air. In this air-conditioner, the ventilation exhaust air that has passed through the total heat exchanger merges with outside air that has passed through an outdoor heat exchanger, and then discharged to the outside. Hence, this air-conditioner can reclaim heat of the ventilation exhaust air to improve the performance of an air-conditioner.

However, when the outside air is relatively high during a cooling operation or relatively low during a heating operation, it is difficult to achieve a good heat exchange efficiency in the outdoor heat exchanger. Thus, even if the total heat exchanger is used, the performance of the air-conditioner cannot be improved sufficiently.

In addition, this air-conditioner has an indoor main air channel with an indoor heat exchanger, an outdoor main air channel with an outdoor heat exchanger, a supply ventilation channel, and an exhaust ventilation channel. Thereby, the air-conditioner can serve as an indoor unit of an air-conditioning system, an outdoor unit of an air-conditioning system, and a ventilator.

Incidentally, the use of the carbon dioxide refrigerant is drawing people's attention. The carbon dioxide refrigerant has a lot of advantages such as safety, nontoxicity, a small global warming coefficient, and so on. Thus, the carbon dioxide refrigerant may be applied to the above air-conditioner. Meanwhile, the carbon dioxide level in the space to be air-conditioned and/or ventilated should be kept low even when a leakage of the carbon dioxide refrigerant has been occurred.

SUMMARY

One or more embodiments provide an air-conditioner with a higher performance. One or more embodiments provide an air-conditioner and/or an air-conditioning system that can prevent that the carbon dioxide level becomes high in a secure manner.

One or more embodiments provide an air-conditioner, comprising: a return-air inlet and a supply-air outlet each communicating with a predetermined space; a first main air channel configured to allow air to flow therein towards the supply-air outlet; a first heat exchanger disposed in the first main air channel to cause a heat-exchange between refrigerant flowing therein and air passing therethrough; an exhaust-air outlet communicating with an outside of the predetermined space; a second main air channel configured to allow air to flow therein towards the exhaust-air outlet; a second heat exchanger disposed in the second main air channel to cause a heat-exchange between refrigerant flowing therein and air passing therethrough; and an exhaust ventilation channel configured to allow air to flow therein from the return-air inlet towards the exhaust-air outlet, wherein: the exhaust ventilation channel is configured to allow ventilation exhaust air to pass through the second heat exchanger, the ventilation exhaust air being air that has been taken in through the return-air inlet and to be discharged through the exhaust-air outlet.

With the above configuration, a difference between temperature of air passing through the second heat exchanger and temperature of the refrigerant flowing in the second heat exchanger is greater when the ventilation exhaust air is used than when outside air is used. Thus, performance of an air-conditioning system including the second heat exchanger can be improved with a simple structure. It is also possible to widen the operating range at low load both during a cooling operation and during a heating operation.

According to one or more embodiments of the air-conditioner mentioned above, the second main air channel is configured to allow substantially only the ventilation exhaust air to pass through the second heat exchanger.

With this configuration, it is possible to maximize the above temperature difference. Thus, performance of the air-conditioning system can be more improved.

According to one or more embodiments of any one of the air-conditioners mentioned above, the air-conditioner further comprises: an outside-air inlet communicating with the outside of the predetermined space, wherein the second main air channel is configured to allow air to flow therein from the outside-air inlet towards the exhaust-air outlet.

With this configuration, it is possible to switch whether the second passing air passes through the second heat exchanger. Thus, it is possible to reduce the flow of the ventilation exhaust air, for instance when difference between temperature of the outside air and temperature of the refrigerant flowing in the second heat exchanger is relatively high.

One or more embodiments provide an air-conditioner, comprising: a return-air inlet and a supply-air outlet each communicating with a predetermined space; a first main air channel configured to allow air to flow therein from the return-air inlet towards the supply-air outlet; a first heat exchanger disposed in the first main air channel to cause a heat-exchange between refrigerant flowing therein and air passing therethrough; an outside-air inlet and an exhaust-air outlet each communicating with an outside of the predetermined space; a second main air channel configured to allow air to flow therein from the outside-air inlet towards the exhaust-air outlet; a second heat exchanger disposed in the second main air channel to cause a heat-exchange between refrigerant flowing therein and air passing therethrough; and an exhaust ventilation channel configured to allow air to flow therein from the return-air inlet towards the exhaust-air outlet, wherein the exhaust ventilation channel is configured to allow ventilation exhaust air to pass through the second heat exchanger, the ventilation exhaust air being air that has been taken in through the return-air inlet and to be discharged through the exhaust-air outlet.

With the above configuration, a difference between temperature of air passing through the second heat exchanger and temperature of the refrigerant flowing in the second heat exchanger is increased by utilizing the ventilation exhaust air. Thus, performance of the air-conditioner can be improved with a simple structure.

According to one or more embodiments of the air-conditioner mentioned above, the exhaust ventilation channel is configured to allow second passing air to be mixed with the ventilation exhaust air before the second passing air passes through the second heat exchanger, the second passing air being air that has been taken in through the outside-air inlet and to be discharged through the exhaust-air outlet.

With this configuration, it is possible to widen the operating range at low load both during a cooling operation and during a heating operation. Thus, performance of the air-conditioner can be further improved.

According to one or more embodiments of any one of the air-conditioners mentioned above, the air-conditioner further comprises: a supply ventilation channel configured to allow air to flow therein from the outside-air inlet towards the supply-air outlet.

With this configuration, the air-conditioner allows air to flow from the outside to the predetermined space to perform a forced air-supply of the predetermined space. Thus, the ventilation of the predetermined space can be enhanced.

According to one or more embodiments of any one of the air-conditioners mentioned above, the supply ventilation channel is configured to allow first passing air to be mixed with ventilation intake air before the first passing air passes through the first heat exchanger, the first passing air being air that has been taken in through the return-air inlet and to be discharged through the supply-air outlet, the ventilation intake air being air that has been taken in through the outside-air inlet and to be discharged through the supply-air outlet.

With this configuration, a difference between temperature of air passing through the first heat exchanger and temperature of the refrigerant flowing in the first heat exchanger is increased by utilizing the ventilation intake air. Thus, performance of the air-conditioner can be improved with a simple structure.

According to one or more embodiments of any one of the air-conditioners mentioned above, the air-conditioner further comprises a total heat exchanger forming at least a part of the supply ventilation channel and at least a part of the exhaust ventilation channel to cause a heat-exchange between the ventilation intake air and the ventilation exhaust air.

With this configuration, temperature of the ventilation intake air is moderated by temperature of the ventilation exhaust air. Thus, an air-conditioning load of the air-conditioner can be reduced even when the ventilation intake air is taken in into the space to be air-conditioned.

According to one or more embodiments of any one of the air-conditioners mentioned above, the air-conditioner further comprises: an airflow regulator configured to regulate a flow of each of at least first passing air, second passing air and the ventilation exhaust air, the first passing air being air that has been taken in through the return-air inlet and to be discharged through the supply-air outlet, the second passing air being air that has been taken in through the outside-air inlet and to be discharged through the exhaust-air outlet.

With this configuration, a flow of each of the first passing air, the second passing air and the ventilation exhaust air can be regulated. Thus, air-conditioning performance and/or ventilation performance of the air-conditioner can be optimized. Regulating a flow of air may include regulating a flow rate of the air, regulating a flow ratio of the air with respect to other air, and/or switching whether flowing the air or not.

According to one or more embodiments of any one of the air-conditioners mentioned above, the airflow regulator includes: a first main damper disposed in the first main air channel; a second main damper disposed in the second main air channel; and an exhaust damper disposed in the exhaust ventilation channel.

With this configuration, since dampers are used, it is possible to regulate the flow of each of the first passing air, the second passing air and the ventilation exhaust air with a simple structure.

According to one or more embodiments of any one of the air-conditioners mentioned above, the first heat exchanger is arranged such that an air-passing direction of the first heat exchanger is inclined with respect to an extending direction of the first main air channel; and the second heat exchanger is arranged such that an air-passing direction of the second heat exchanger is inclined with respect to an extending direction of the second main air channel.

With this configuration, an air-passing area of the first heat exchanger can be made smaller than a sectional area of the first main air channel and an air-passing area of the second heat exchanger can be made smaller than a sectional area of the second main air channel. Thus, a size of the air-conditioner can be reduced while maintaining heat-exchange capabilities of the first heat exchanger and the second heat exchanger.

According to one or more embodiments of any one of the air-conditioners mentioned above, the first main air channel and the second main air channel are arranged substantially in parallel and configured such that a direction from the return-air inlet to the supply-air outlet and a direction from the outside-air inlet to the exhaust-air outlet are substantially opposite.

With this configuration, the first main air channel and the second main air channel can be separated into two sides. Thus, it is possible to obtain the air-conditioner that is easy to position between the predetermined space and the outside thereof. Moreover, the first passing air and the second passing air flow substantially countercurrently. Thus, a configuration can be obtained that is suitable for arranging components such as the first heat exchanger, the second heat exchanger, and so on.

According to one or more embodiments of any one of the air-conditioners mentioned above, the first main air channel and the second main air channel are arranged substantially in parallel and configured such that a direction from the return-air inlet to the supply-air outlet and a direction from the outside-air inlet to the exhaust-air outlet are substantially the same.

With this configuration, the first main air channel and the second main air channel can be separated into two sides. Thus, it is possible to obtain the air-conditioner that is easy to position between the predetermined space and the outside thereof. Moreover, the first passing air and the second passing air flow substantially parallelly. Thus, a configuration can be obtained that is suitable for smoothly passing the first passing air and the second passing air.

According to one or more embodiments of any one of the air-conditioners mentioned above, the supply ventilation channel and the exhaust ventilation channel are arranged substantially in parallel and configured such that a direction from the outside-air inlet to the supply-air outlet and a direction from the return-air inlet to the exhaust-air outlet are substantially opposite.

With this configuration, the ventilation intake air and the ventilation exhaust air flow substantially countercurrently. Thus, a configuration can be obtained that is suitable for arranging components such as the total heat exchanger, the first fan, the second fan, and so on.

According to one or more embodiments of any one of the air-conditioners mentioned above, the supply ventilation channel and the exhaust ventilation channel are arranged substantially in parallel and configured such that a direction from the outside-air inlet to the supply-air outlet and a direction from the return-air inlet to the exhaust-air outlet are substantially the same.

With this configuration, the ventilation intake air and the ventilation exhaust air flow substantially parallelly. Thus, a configuration can be obtained that is suitable for smoothly passing the ventilation intake air and the ventilation exhaust air.

According to one or more embodiments of any one of the air-conditioners mentioned above, the air-conditioner further comprises: a pipe connecting mechanism (i.e. piping) configured to connect each of the first heat exchanger and the second heat exchanger to a refrigerant compressor, via a high-pressure gas refrigerant pipe connected to a discharge side of the refrigerant compressor and a low-pressure gas refrigerant pipe connected to a suction side of the refrigerant compressor, such that the first heat exchanger, the second heat exchanger and the refrigerant compressor form a heat pump circuit.

With this configuration, the air-conditioning system can be obtained without mounting the refrigerant compressor and so on of the heat pump circuit on the air-conditioner. Thus, it is possible to obtain the air-conditioner that is compact, light, silent, and/or easy to design, install, and/or do maintenance.

According to one or more embodiments of any one of the air-conditioners mentioned above, each of the first and second heat exchangers is configured to flow carbon dioxide refrigerant therein.

The heat exchange efficiency of a system using carbon dioxide refrigerant tends to be lower than a similar system using other refrigerant such as R410A or other HFC. On this point, in the above air-conditioner, the heat exchange efficiency can be improved in spite of using carbon dioxide refrigerant, since the second heat exchanger can exchange heat with the ventilation exhaust air.

According to one or more embodiments of any one of the air-conditioners mentioned above, the airflow regulator is configured to regulate the flows of the second passing air and the ventilation exhaust air such that the temperature of an air which goes through the second heat exchanger is under the supercritical temperature of the carbon dioxide refrigerant flowing in the second heat exchanger.

With this configuration, the temperature of the air subjected to a heat exchange with the carbon dioxide refrigerant at the second heat exchanger can be maintained under the supercritical temperature of the carbon dioxide refrigerant.

According to one or more embodiments of any one of the air-conditioners mentioned above, each of the first and second heat exchangers is configured to flow carbon dioxide refrigerant therein. The airflow regulator is configured to regulate the flows of the second passing air and the ventilation exhaust air such that the temperature of an air which goes through the second heat exchanger is under the supercritical temperature of the carbon dioxide refrigerant flowing in the second heat exchanger.

The heat exchange efficiency of a system using carbon dioxide refrigerant tends to be lower than a similar system using other refrigerant such as R410A or other HFC. On this point, in the above air-conditioner, the heat exchange efficiency can be improved in spite of using carbon dioxide refrigerant, since the second heat exchanger can exchange heat with the ventilation exhaust air. In addition, the temperature of the air subjected to a heat exchange with the carbon dioxide refrigerant at the second heat exchanger can be maintained under the supercritical temperature of the carbon dioxide refrigerant.

According to one or more embodiments of any one of the air-conditioners mentioned above, the airflow regulator is configured to switch whether the ventilation exhaust air goes through the second heat exchanger.

With this configuration, it is possible to achieve an appropriate air flow in more secure manner.

According to one or more embodiments of any one of the air-conditioners mentioned above, the air-conditioner further comprises a controller configured to determine whether a predetermined condition is met that the temperature of an air drawn into the air-conditioner from the outside-air inlet is higher than or equal to a predetermined threshold value, wherein the airflow regulator is configured to regulate the flows of the second passing air and the ventilation exhaust air such that the ventilation exhaust air goes through the second heat exchanger if the predetermined condition is met, and that the ventilation exhaust air is prevented from going through the second heat exchanger if the predetermined condition is not met.

With this configuration, the temperature of the air subjected to a heat exchange with the refrigerant at the second heat exchanger can be appropriately lowered. Thus, the heat exchange efficiency of the second heat exchanger can be further improved.

According to one or more embodiments of any one of the air-conditioners mentioned above, the airflow regulator is configured to switch whether the ventilation exhaust air that has been passed through the total heat exchanger goes through the second heat exchanger.

With this configuration, it is possible to achieve an appropriate air flow in more secure manner.

According to one or more embodiments of any one of the air-conditioners mentioned above, the second heat exchanger includes: a second main heat exchanger configured to cause a heat-exchange between refrigerant flowing therein and air passing therethrough; and a second sub heat exchanger disposed in the exhaust ventilation channel to cause a heat-exchange between refrigerant flowing therein and air passing there through.

In other words, the second sub heat exchanger is arranged such that a flow ratio of the ventilation exhaust air with respect to the second passing air is higher in the second sub heat exchanger than in the second main heat exchanger. Thereby, refrigerant can be subjected to a heat exchange with cooler air after flowing through the second main heat exchanger in a cooling operation. Thus, heat exchange efficiency can be improved in the cooling operation.

According to one or more embodiments of any one of the air-conditioners mentioned above, the second sub heat exchanger is configured to flow refrigerant therein that has flown through the second main heat exchanger when the second heat exchanger functions as a condenser.

With this configuration, it is possible to ensure an improvement in heat exchange efficiency of the cooling operation.

According to one or more embodiments of any one of the air-conditioners mentioned above, the second heat exchanger includes: a second main heat exchanger configured to cause a heat-exchange between refrigerant flowing therein and air passing therethrough; and a second sub heat exchanger disposed in the exhaust ventilation channel to cause a heat-exchange between refrigerant flowing therein and air passing there through.

In other words, the second sub heat exchanger is arranged such that a flow ratio of the ventilation exhaust air with respect to the second passing air is higher in the second sub heat exchanger than in the second main heat exchanger. Thereby, refrigerant can be subjected to a heat exchange with cooler air after flowing through the second main heat exchanger in a cooling operation. Thus, heat exchange efficiency can be improved in the cooling operation.

According to one or more embodiments of any one of the air-conditioners mentioned above, the second sub heat exchanger is configured to flow refrigerant therein that has flown through the second main heat exchanger when the second heat exchanger functions as a condenser.

With this configuration, it is possible to ensure an improvement in heat exchange efficiency of the cooling operation.

According to one or more embodiments of any one of the air-conditioners mentioned above, the second sub heat exchanger is arranged so as to allow the ventilation exhaust air to pass therethrough and so as to prevent the second passing air from passing therethrough.

With this configuration, it is easy to make the flow ratio of ventilation exhaust air with respect to second passing air higher in the second sub heat exchanger than in the second main heat exchanger. The second sub heat exchanger may be arranged so as not to allow the second passing air to pass therethrough.

According to one or more embodiments of any one of the air-conditioners mentioned above, the second sub heat exchanger and the second main heat exchanger are arranged in series in this order along a direction of airflow of the ventilation exhaust air.

With this configuration, the ventilation exhaust air can be mixed with the second passing air after passing through the second sub heat exchanger. Thus, it is easy to make the flow ratio of ventilation exhaust air with respect to second passing air higher in the second sub heat exchanger than in the second main heat exchanger.

According to one or more embodiments of any one of the air-conditioners mentioned above, the total heat exchanger, the second sub heat exchanger and the second main heat exchanger are arranged in series in this order along a direction of airflow of the ventilation exhaust air.

With this configuration, it is possible to further improve the heat exchange efficiency of the second heat exchanger.

According to one or more embodiments of any one of the air-conditioners mentioned above, the second main heat exchanger is arranged so as to allow the second passing air to pass therethrough and so as to prevent the ventilation exhaust air from passing therethrough.

With this configuration, it is easy to make the flow ratio of ventilation exhaust air with respect to second passing air higher in the second sub heat exchanger than in the second main heat exchanger. The second main heat exchanger may be arranged so as not to allow the ventilation exhaust air to pass therethrough.

According to one or more embodiments of any one of the air-conditioners mentioned above, the second main heat exchanger and the second sub heat exchanger form a plate-like shape; and the exhaust ventilation channel has a separation plate separating a space where air is drawn to the second main heat exchanger and the second sub heat exchanger into a main space where air is drawn to the second main heat exchanger and a sub space where air is drawn to the second sub heat exchanger.

With this configuration, the separation plate separates the second main air channel and the exhaust ventilation channel on an upstream side of the second main heat exchanger and the second sub heat exchanger. Thus, it is easy to make the flow ratio of ventilation exhaust air with respect to second passing air higher in the second sub heat exchanger than in the second main heat exchanger.

According to one or more embodiments of any one of the air-conditioners mentioned above, the second sub heat exchanger is arranged so as to come into contact with at least a part of the second passing air.

With this configuration, a heat exchange between refrigerant flowing in the second sub heat exchanger and the second passing air is caused. Thus, performance of the air-conditioner can be improved even when the ventilation exhaust air is not passing through the second sub heat exchanger.

According to one or more embodiments of any one of the air-conditioners mentioned above, the second sub heat exchanger is disposed on a downstream side of the total heat exchanger in the direction from the return-air inlet to the exhaust-air outlet.

With this configuration, difference between temperature of the ventilation intake air and temperature of the ventilation exhaust air in the total heat exchanger is not reduced by the second sub heat exchanger. Thus, heat exchanging efficiency in the total heat exchanger can be maintained high.

According to one or more embodiments of any one of the air-conditioners mentioned above, the air-conditioner further comprises: an electrical pre-heater disposed in the supply ventilation channel between the outside-air inlet and the total heat exchanger.

With this configuration, the ventilation intake air can be pre-heated before flowing into the total heat exchanger in a heating operation, i.e. when the first heat exchanger functions as a condenser. Thus, it is prevented that cold air is discharged from the supply-air outlet and it is possible to reduce a heat exchange load of the total heat exchanger.

According to one or more embodiments of any one of the air-conditioners mentioned above, the air-conditioner further comprises: a housing accommodating at least the first main air channel, the second main air channel, and the exhaust ventilation channel; a first fan configured to draw air in the housing towards the supply-air outlet; and a second fan configured to draw air in the housing towards the exhaust-air outlet.

With this configuration, components of an indoor unit of an air-conditioning system, an outdoor unit of an air-conditioning system, and a ventilator are integrated as a unit in the same housing. Thus, it is possible to obtain the air-conditioner that is easy to design, install, and/or do maintenance. Moreover, since appropriate air flows in the air-conditioner are generated, performance of the air-conditioner can be ensured.

One or more embodiments provide an air-conditioner, comprising: a return-air inlet and a supply-air outlet each communicating with a predetermined space; a first main air channel configured to allow air to flow therein from the return-air inlet towards the supply-air outlet; a first heat exchanger disposed in the first main air channel to cause a heat-exchange between carbon dioxide refrigerant flowing therein and air passing therethrough; an outside-air inlet and an exhaust-air outlet each communicating with an outside of the predetermined space; a second main air channel configured to allow air to flow therein from the outside-air inlet towards the exhaust-air outlet; a second heat exchanger disposed in the second main air channel to cause a heat-exchange between carbon dioxide refrigerant flowing therein and air passing therethrough; a supply ventilation channel configured to allow air to flow therein from the outside-air inlet towards the supply-air outlet; an exhaust ventilation channel configured to allow air to flow therein from the return-air inlet towards the exhaust-air outlet; a first fan configured to form an air flow towards the supply-air outlet; a second fan configured to form an air flow towards the exhaust-air outlet; and a controller configured to acquire CO2 information indicating a carbon dioxide level in the predetermined space and control at least the first fan and the second fan according to the CO2 information.

With the above configuration, both of the first fan and the second fan can be operated to increase ventilation amount of the predetermined space according to carbon dioxide level in the predetermined space. Thus, it is possible to prevent that the carbon dioxide level becomes high in the space to be air-conditioned and/or ventilated by the air-conditioner even when, for instance, a leakage of the carbon dioxide refrigerant is occurred. The carbon dioxide level in the predetermined space may be a carbon dioxide concentration of air existing in or taken from the predetermined space.

DETAILED DESCRIPTION

One or more embodiments of an air-conditioner and an air-conditioning system are described below with reference to the drawings.

<Configuration of Air-Conditioning System>

Figure 1:
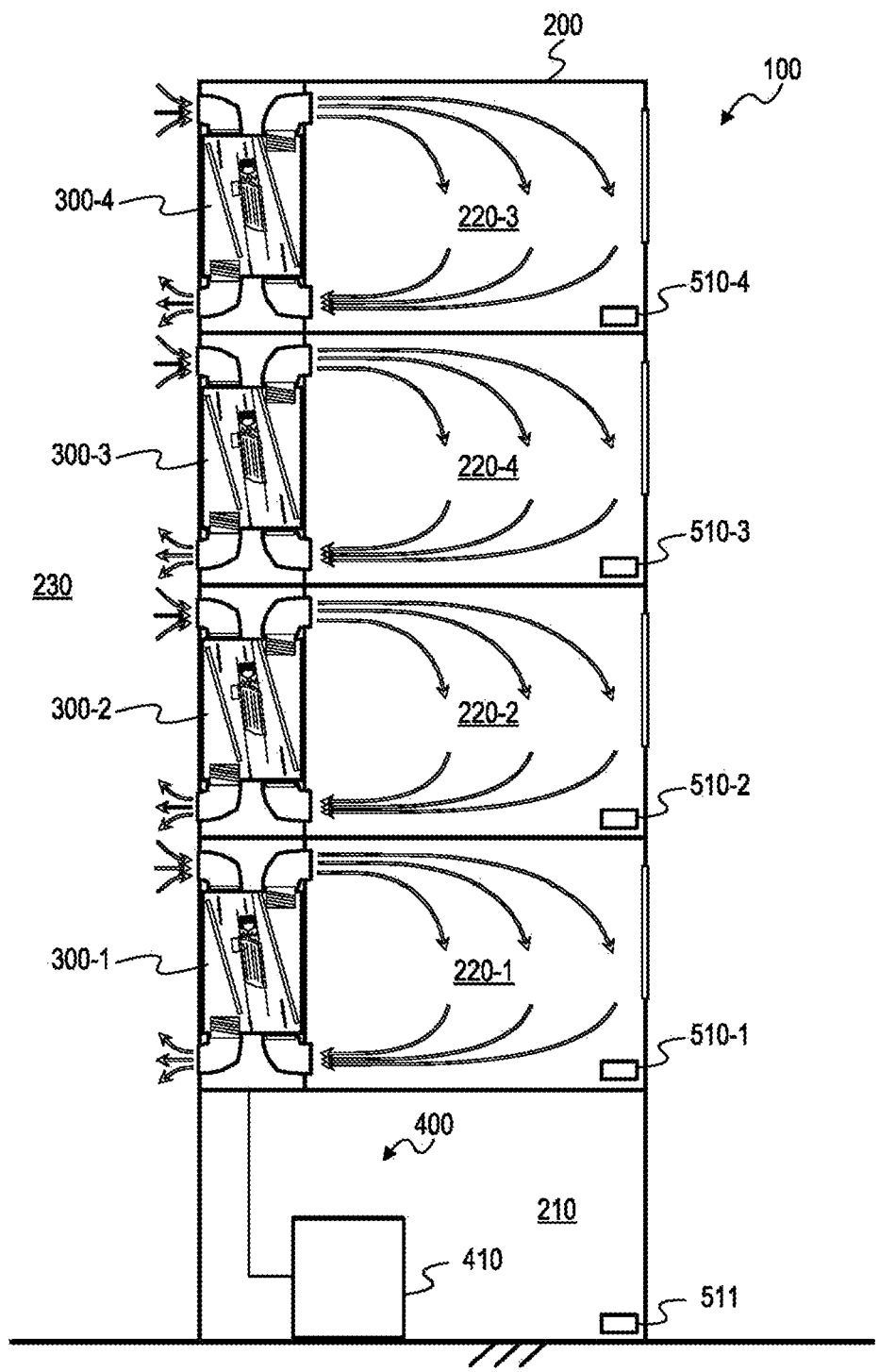
FIG. 1 is a schematic diagram indicating an arrangement of an air-conditioning system including a plurality of air-conditioners according to one or more embodiments.

FIG. 1 is a schematic diagram indicating an arrangement of the air-conditioning system including a plurality of air-conditioners according to one or more embodiments.

The air-conditioning system 100 is a heat pump type air-conditioning system using carbon dioxide (CO2) refrigerant. As shown in FIG. 1, a most part of the air-conditioning system 100 is arranged in a building 200. This building has a plurality of predetermined spaces 220 and a machine space 210. Each of the predetermined spaces 220 is a space to be ventilated and/or air-conditioned as necessary. Although the number of the predetermined spaces 220 are four in FIG. 1, it may be one, two, or any other counting number. Although the machine space 210 is within the building 200 in FIG. 1, it may be located substantially in the outside 230 of the building 200. The positional arrangement of the spaces is not limited to the arrangement depicted in FIG. 1.

The air-conditioning system 100 comprises a plurality of air-conditioners 300, a refrigerant compressor system 400, a plurality of room CO2 sensors 510, and a machine space CO2 sensor 511. The plurality of air-conditioners 300 have substantially the same configuration. The plurality of room CO2 sensors 510 and the machine space CO2 sensor 511 have substantially the same configuration.

The first to fourth the air-conditioners 300-1 to 300-4 are arranged in or close to the first to fourth predetermined spaces 220-1 to 200-4, respectively. The refrigerant compressor system 400 extends from the machine space 210 to each air-conditioner 300. The refrigerant compressor system 400 includes a compressor unit 410 arranged in the machine space 210. The first to fourth room CO2 sensors 510-1 to 510-4 are arranged in the first to fourth predetermined spaces 220-1 to 200-4, respectively. The machine space CO2 sensor 511 is arranged in the machine space 210. Each CO2 sensor 510, 511 may be positioned close to the floor of the corresponding space 220, 210. As each of the CO2 sensors 510, 511, a sensor performing a general refrigerant leakage detection may be utilized.

Figure 2:
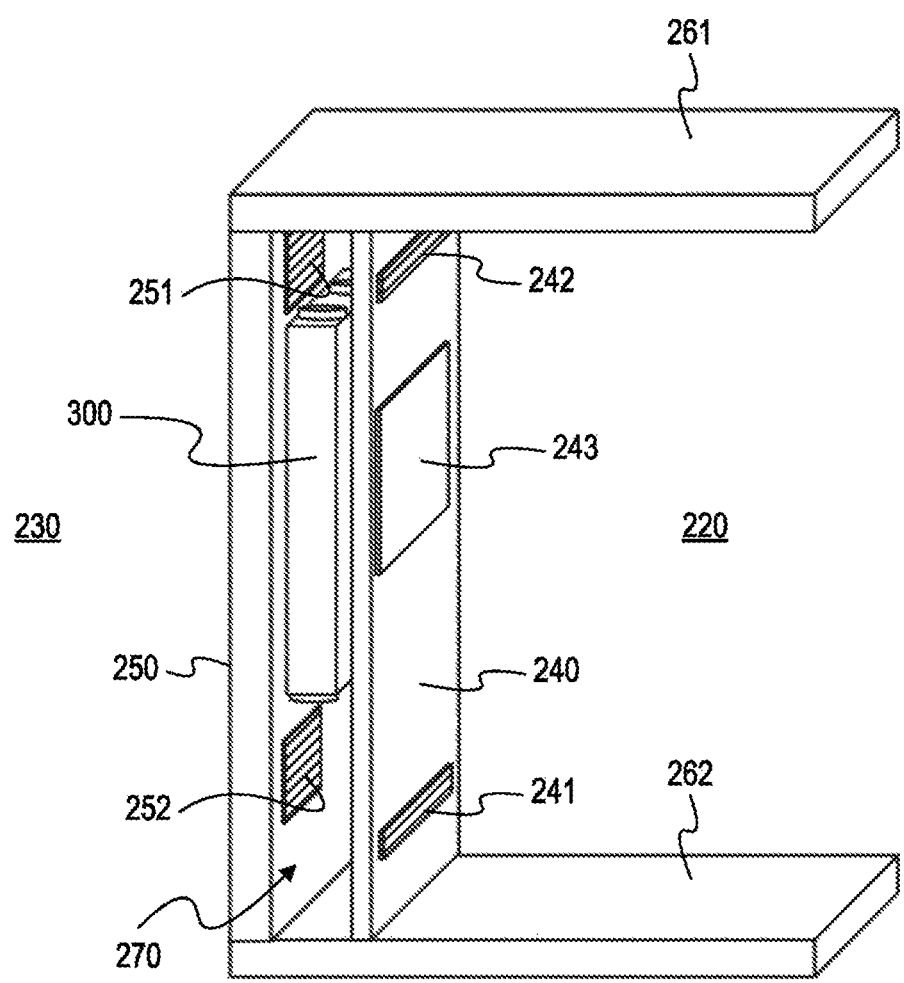
FIG. 2 is a perspective view showing an installation of the air-conditioner.

FIG. 2 is a perspective view showing an installation of the air-conditioner 300.

Each predetermined space 220 is substantially sectioned off in a vertical direction by a ceiling slab 261 and a floor slab 262, and substantially sectioned off in a horizontal direction by one or more of inner walls 240. At least one of the inner walls 240 faces an outer wall 520 of the building 200 (see FIG. 1), while being spaced away from the facing outer wall 520.

As shown in FIG. 2, the air-conditioner 300 is positioned between the predetermined space 220 and the outside 230. More specifically, the air-conditioner 300 is installed in a rear wall space 270 defined by the ceiling slab 261, the floor slab 262, the inner wall 240 and the outer wall 520.

The inner wall 240 is provided with an inspection opening (not show) in an area facing the air-conditioner 300, and an inspection door 243 covering the opening. The inner wall 240 is formed with an RA (return-air) suction grill 241 and an SA (supply-air) discharge grill 242 which are openings of the inner wall 240. The outer wall 250 is formed with an OA (outside-air) suction grill 251 and an EA (exhaust-air) discharge grill 252 which are openings of the outer wall 250. The rear wall space 270 side of each grills 241, 242, 251, 252 is connected to the air-conditioner 300 by a duct (not shown) or the like. Thereby, the air-conditioner 300 communicates with the predetermined space 220 at two different positions and with the outside 230 at two different positions.

The air-conditioner 300 may have a substantially box shape which is thin in the horizontal direction. This shape may be advantageous for arranging the air-conditioner 300 in the rear wall space 270 while keeping the rear wall space 270 thin as much as possible. Meanwhile, the arrangement of the air-conditioner 300 is not limited to the arrangement depicted in FIG. 2. For instance, a part of the air-conditioner 300 may be exposed to the predetermined space 220 and/or the outside 230, and whole of the air-conditioner 300 may be exposed to the predetermined space 220 or the outside 230.

In each air-conditioner 300, components of an indoor unit of an air-conditioning system, an outdoor unit of an air-conditioning system, a ventilator, and an air heat reclaimer are integrated.

Figure 3:
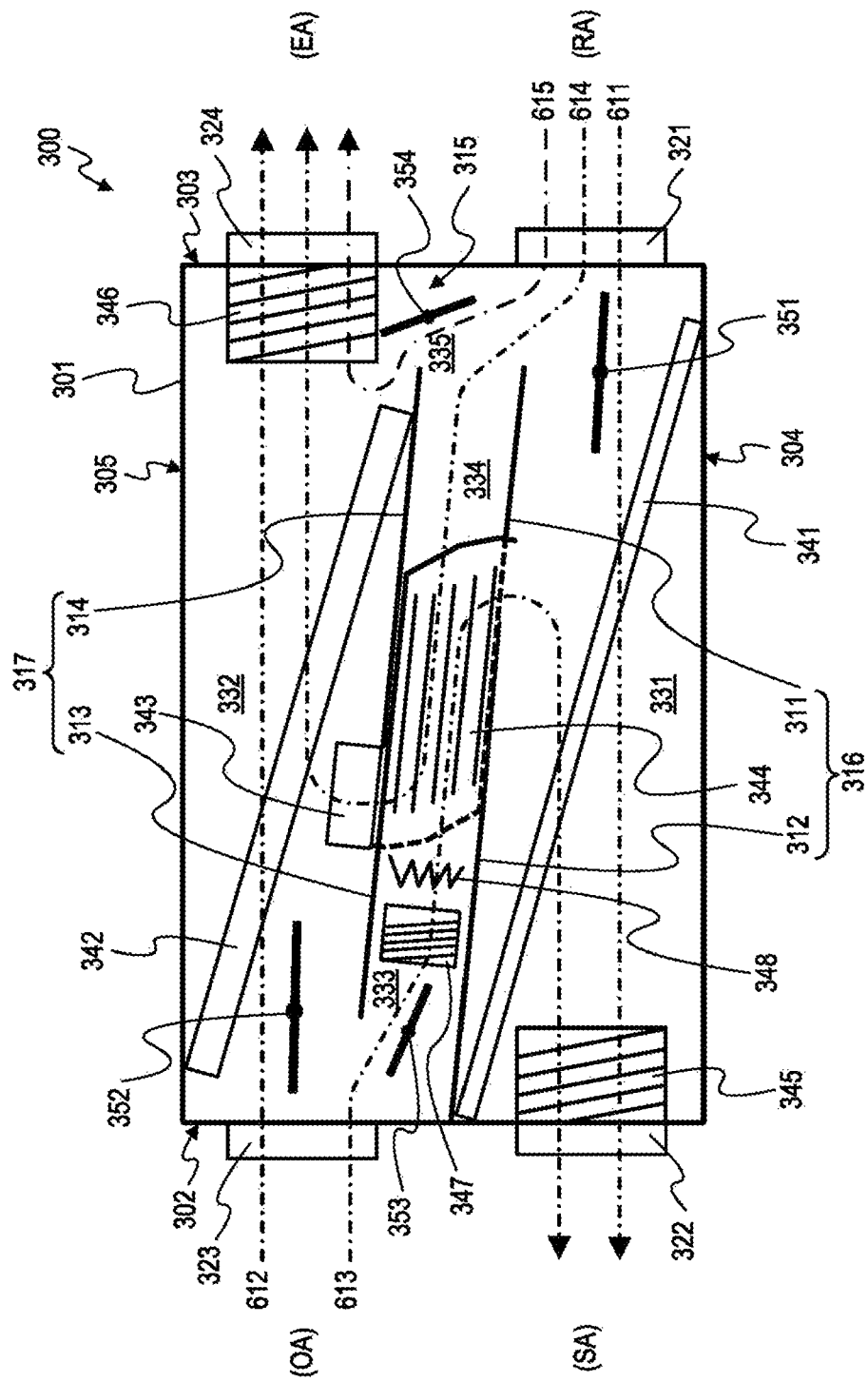
FIG. 3 is a schematic diagram indicating a structural configuration of the air-conditioner.

FIG. 3 is a schematic diagram indicating a structural configuration of the air-conditioner 300.

For instance, the left side and the right side in the FIG. 3 correspond to the upper side and the lower side in the FIG. 2, respectively, and the vertical direction in the FIG. 3 correspond to the depth direction in the FIG. 2. In other words, the left side and the right side in the FIG. 3 may correspond to the upper side and the lower side in a state where the air-conditioner 300 is used, respectively, and the vertical direction in the FIG. 3 may correspond to a horizontal direction extending along the inner wall 240 and/or the outer wall 520.

The air-conditioner 300 has a housing 301, a return-air inlet 321, a supply-air outlet 322, an outside-air inlet 323, an exhaust-air outlet 324, an RA separator 311, an SA separator 312, an OA separator 313, an EA separator and a total heat exchanger 344.

The housing 301 is a boxy member having a substantially cuboid shape and accommodating a most part of the air-conditioner 300. The housing 301 includes a pair of opposing main faces (arranged frontward and rearward in FIG. 3, and thus omitted) which are substantially parallel to the inner wall 240 and/or the outer wall 250.

Each of the return-air inlet 321 and the supply-air outlet 322 communicates with the predetermined space 220, and each of the outside-air inlet 323 and the exhaust-air outlet 324 communicates with the outside 230 (see FIG. 2). More specifically, each of the return-air inlet 321, the supply-air outlet 322, the outside-air inlet 323 and the exhaust-air outlet 324 has an opening formed in the housing 301. The return-air inlet 321, the supply-air outlet 322, the outside-air inlet 323 and the exhaust-air outlet 324 are connected to the RA suction grill 241, the SA discharge grill 242, the OA suction grill 251 and the EA discharge grill 252 by ducts or the like, respectively in this order.

The return-air inlet 321, the supply-air outlet 322, the outside-air inlet 323 and the exhaust-air outlet 324 are substantially arranged along the same plane which is substantially parallel to the above-mentioned main faces of the housing 301, i.e. substantially parallel to the inner wall 240 and/or the outer wall 250.

The supply-air outlet 322 and the outside-air inlet 323 are arranged on the same first face 302 of the housing 301, and may be on the side closer to the supply-air discharge grill 242 and the outside-air suction grill 251 in a state where the air-conditioner 300 is used. The return-air inlet 321 and the exhaust-air outlet 324 are arranged on the same second face 303 of the housing 301 that is opposite to the first face 302, and may be on the side closer to the return-air suction grill 241 and the exhaust-air discharge grill 252 in a state where the air-conditioner 300 is used.

The housing 301 has third and fourth faces 304, 305 that are opposite to each other and each connected to both the first and second faces 302, 303. The return-air inlet 321 and the supply-air outlet 322 are arranged closer to the third face 304 than to the fourth face 305, and the outside-air inlet 323 and the exhaust-air outlet 324 are arranged closer to the fourth face 305 than to the third face 304. In other words, the return-air inlet 321, the supply-air outlet 322, the outside-air inlet 323 and the exhaust-air outlet 324 are arranged in this order around the housing 301.

The housing 301 also has fifth and sixth faces (not shown), as the above-mentioned main faces, that are opposite to each other and each connected to all the first to fourth faces 302 to 305.

The RA separator 311, the SA separator 312, the OA separator 313 and the EA separator 314 are arranged within the housing 301 and each connected to both the fifth and sixth faces of the housing 301. Each of the separators 311, 312, 313, 314 is substantially parallel to the third face 304 and/or the fourth face 305.

The RA separator 311 is arranged close to the return-air inlet 321. Meanwhile, the RA separator 311 is configured to form an opening between the RA separator 311 and the second face 303 of the housing 301. The SA separator 312 is arranged close to the supply-air outlet 322 and substantially flush with the RA separator 311. The SA separator 312 is connected to both the first face 302 of the housing 301 and the RA separator 311. Meanwhile, the RA separator 311 and the SA separator 312 form an opening therebetween. Thus, the separator unit (hereinafter referred to as "the first separator unit 316") of the RA separator 311 and the SA separator 312 separates the inner space of the housing 301, while having an opening close to the return-air inlet 321 and another opening in the middle.

The OA separator 313 is arranged close to the outside-air inlet 323. Meanwhile, the OA separator 313 is configured to form an opening between the OA separator 313 and the first face 302 of the housing 301. The EA separator 314 is arranged close to the exhaust-air outlet 324 and substantially flush with the OA separator 313. Meanwhile, EA separator 314 is configured to form an opening between EA separator 314 and the second face 303 of the housing 301. This opening is hereinafter referred to as "the inner aperture 315." The EA separator 314 is connected to the OA separator 313. Meanwhile, the OA separator 313 and the EA separator 314 form an opening therebetween. Thus, the separator unit (hereinafter referred to as "the second separator unit") of the OA separator 313 and the EA separator 314 separates the inner space of the housing 301, while having an opening close to the outside-air inlet 323, another opening in the middle, and further another opening (the inner aperture 315) close to the exhaust-air outlet 324.

The first separator unit 316 and the second separator unit 317 are spaced away from each other. The first separator unit 316 is arranged on the third face 304 side, and the second separator unit 317 is arranged on the fourth face 305 side. In other words, the first separator unit 316 is arranged closer to the return-air inlet 321 and the supply-air outlet 322 than the second separator unit 317, and the second separator unit 317 is arranged closer to the outside-air inlet 323 and the exhaust-air outlet 324 than the first separator unit 316.

The first and second separator units 316, 317 extend, substantially in parallel to each other, from the area between the return-air inlet 321 and the exhaust-air outlet 324 and the area between the supply-air outlet 322 and the outside-air inlet 323. As shown in FIG. 2, the extending direction of the first and second separator units 316, 317 may be slightly inclined towards the outside-air inlet 323 and/or the return-air inlet 321. The RA separator 311 of the first separator unit 316 and the EA separator 314 of the second separator unit 317 forms a space therebetween that communicates with the return-air inlet 321. The SA separator 312 and the OA separator 313 forms a space therebetween that communicates with the outside-air inlet 323.

The total heat exchanger 344 is disposed between the first separator unit 316 and the second separator unit 317. The total heat exchanger 344 has a plurality of first air paths and a plurality of second air paths (partially shown in FIG. 3) intersecting to each other via liners without merging to each other. The total heat exchanger 344 is configured to cause a total heat-exchange between air passing through the first air paths and air passing through the second air paths.

The total heat exchanger 344 is arranged such that the first air paths communicate with each of the above-mentioned space formed between the SA separator 312 and the OA separator 313 and the above-mentioned opening formed between the RA separator 311 and the SA separator 312. The total heat exchanger 344 is also arranged such that the second air paths communicate with each of the above-mentioned space formed between the RA separator 311 and the EA separator 314 and the above-mentioned opening formed between the OA separator 313 and the EA separator 314.

Thus, the air-conditioner 300 has a first main air channel 331, a second main air channel 332, a supply ventilation channel 333 and an exhaust ventilation channel 334 which are accommodated in the housing 301.

The first main air channel 331 is a space substantially formed by the third face 304 of the housing 301 and the first separator unit 316 therebetween. The first main air channel 331 is configured to allow air to flow therein from the return-air inlet 321 towards the supply-air outlet 322. The air that has been taken in through the return-air inlet 321 and to be discharged through the supply-air outlet 322 is hereinafter referred to as "the first passing air 611." As indicated by one of dashed-dotted arrows in FIG. 3, the first passing air 611 flows in the first main air channel 331.

The second main air channel 332 is a space substantially formed by the fourth face 305 of the housing 301 and the second separator unit 317 therebetween. The second main air channel 332 is configured to allow air to flow therein from the outside-air inlet 323 towards the exhaust-air outlet 324. The air that has been taken in through the outside-air inlet 323 and to be discharged through the exhaust-air outlet 324 is hereinafter referred to as "the second passing air 612." As indicated by one of dashed-dotted arrows in FIG. 3, the second passing air 612 flows in the second main air channel 332.

It should be noted that, the first main air channel 331 and the second main air channel 332 are arranged substantially in parallel, and configured such that a direction from the return-air inlet 321 to the supply-air outlet 322 and a direction from the outside-air inlet 323 to the exhaust-air outlet 324 are substantially opposite.

The supply ventilation channel 333 is substantially formed by the above-mentioned opening of the OA separator 313 that is close to the outside-air inlet 323, the above-mentioned space formed between the OA separator 313 and the SA separator 312, the first air paths of the total heat exchanger 344, and the above-mentioned opening formed between the SA separator 312 and the RA separator 311. The supply ventilation channel 333 is configured to allow air to flow therein from the outside-air inlet 323 towards the supply-air outlet 322. The air that has been taken in through the outside-air inlet 323 and to be discharged through the supply-air outlet 322 is hereinafter referred to as "the ventilation intake air 613." As indicated by one of dashed-dotted arrows in FIG. 3, the ventilation intake air 613 flows a part of the second main air channel 332, the supply ventilation channel 333, and then a part of the first main air channel 331.

The exhaust ventilation channel 334 is substantially formed by the above-mentioned opening of the RA separator 311 that is close to the return-air inlet 321, the above-mentioned space formed between the RA separator 311 and the EA separator 314, the second air paths of the total heat exchanger 344, and the above-mentioned opening formed between the OA separator 313 and the EA separator 314. The exhaust ventilation channel 334 is configured to allow air to flow therein from the return-air inlet 321 towards the exhaust-air outlet 324. The air that has been taken in through the return-air inlet 321 and to be discharged through the exhaust-air outlet 324 is hereinafter referred to as "the ventilation exhaust air 614." As indicated by one of dashed-dotted arrows in FIG. 3, the ventilation exhaust air 614 flows a part of the first main air channel 331, the exhaust ventilation channel 334, and then a part of the second main air channel 332.

It is also can be said that the total heat exchanger 344 forms at least a part of the supply ventilation channel 333 and at least a part of the exhaust ventilation channel 334. Thus, the total heat exchanger 344 is configured to cause a heat-exchange between the ventilation intake air 613 and the ventilation exhaust air 614.

The air-conditioner 300 further has a first heat exchanger 341, a second main heat exchanger 342 and a second sub heat exchanger 343. The first heat exchanger 341 and a set of the second main heat exchanger 342 and the second sub heat exchanger 343 are configured to function as an evaporator and a condenser of a heat pump circuit. Each of the first heat exchanger 341, the second main heat exchanger 342 and the second sub heat exchanger 343 is configured to cause a heat-exchange between refrigerant flowing therein and air passing therethrough. It is noted that the second main heat exchanger 342 and the second sub heat exchanger 343 may be regarded as a single heat exchanger (a second heat exchanger 342, 343).

The first heat exchanger 341 is disposed in the first main air channel 331. More specifically, the first heat exchanger 341 is disposed between the above-mentioned opening formed between the RA separator 311 and the SA separator 312 (i.e. the outlet of the first air paths of the total heat exchanger 344) and the supply-air outlet 322. In other words, the first heat exchanger 341 is arranged so as to allow not only the first passing air 611 but also the ventilation intake air 613 to pass therethrough. It can also be said that the supply ventilation channel 333 is configured to allow the first passing air 611 to be mixed with the ventilation intake air 613 before the first passing air 611 passes through the first heat exchanger 341. The first heat exchanger 341 may be arranged such that an air-passing direction of the first heat exchanger 341 is inclined with respect to an extending direction of the first main air channel 331.

The second main heat exchanger 342 is disposed in the second main air channel 332. More specifically, the second main heat exchanger 342 is disposed between the above-mentioned opening formed between the OA separator 313 and the EA separator 314 (i.e. the outlet of the second air paths of the total heat exchanger 344) and the exhaust-air outlet 324. In other words, the second main heat exchanger 342 is arranged so as to allow not only the second passing air 612 but also the ventilation exhaust air 614 to pass therethrough. It can also be said that the exhaust ventilation channel 334 is configured to allow the second passing air 612 to be mixed with the ventilation exhaust air 614 before the second passing air 612 passes through the second main heat exchanger 342. The second main heat exchanger 342 may be arranged such that an air-passing direction of the second main heat exchanger 342 is inclined with respect to an extending direction of the second main air channel 332.

The second sub heat exchanger 343 is disposed in the exhaust ventilation channel 334. The second sub heat exchanger 343 is disposed on a downstream side of the total heat exchanger 344 in the direction from the return-air inlet 321 to the exhaust-air outlet 324 (i.e. on the outlet side of the second air paths of the total heat exchanger 344). More specifically, the second sub heat exchanger 343 is arranged in the second main air channel 332 so as to cover the above-mentioned opening formed between the OA separator 313 and the EA separator 314 (i.e. to cover the outlet of the second air paths of the total heat exchanger 344).

Thus, the total heat exchanger 344, the second sub heat exchanger 343 and the second main heat exchanger 342 are arranged in series in this order along a direction of airflow of the ventilation exhaust air 614. It can be said that the second sub heat exchanger 343 is arranged so as to allow the ventilation exhaust air 614 to pass therethrough and prevent the second passing air 612 from passing therethrough, while coming into contact with at least a part of the second passing air 612. It can also be said that the second sub heat exchanger 343 is arranged such that a flow ratio of the ventilation exhaust air 614 with respect to the second passing air 612 is higher in the second sub heat exchanger 343 than in the second main heat exchanger 342.

The exhaust ventilation channel 334 further has an exhaust bypass channel 335 within the housing 301. The exhaust bypass channel 335 is substantially formed by the above-mentioned the inner aperture 315 of the EA separator 314 that is close to the exhaust-air outlet 324.

The exhaust bypass channel 335 is configured to allow air to flow therein from the return-air inlet 321 towards the exhaust-air outlet 324 without passing through any one of the first heat exchanger 341, the total heat exchanger 344 and the second main heat exchanger 342. The air that has been taken in through the return-air inlet 321 and to be discharged through the exhaust-air outlet 324 without passing through the total heat exchanger 344 (i.e. by passing through the exhaust bypass channel 335) is hereinafter referred to as "the exhaust bypass air 615." As indicated by one of dashed-dotted arrows in FIG. 3, the exhaust bypass air 615 flows a part of the first main air channel 331, the exhaust bypass channel 335, and then a part of the second main air channel 332. It can be said that the exhaust bypass air 615 is a part of the ventilation exhaust air 614.

The air-conditioner 300 further has a first fan 345, a second fan 346, a third fan 347, a first main damper 351, a second main damper 352, a second sub damper 353 and an exhaust bypass damper (an exhaust damper) 354 each of which is a motor damper.

The first fan 345 may be disposed in the first main air channel 331 so as to cover the supply-air outlet 322 from the inside of the housing 301. The first fan 345 is configured to draw air inside the housing 301 towards the supply-air outlet 322.

The second fan 346 may be disposed in the second main air channel 332 so as to cover the exhaust-air outlet 324 from the inside of the housing 301. The second fan 346 is configured to draw air inside the housing 301 towards the exhaust-air outlet 324.

The third fan 347 is disposed in the supply ventilation channel 333, i.e. between the outside-air inlet 323 and the total heat exchanger 344. The third fan 347 is configured to draw air from the outside-air inlet 323 towards the supply-air outlet 322 via the first air paths of the total heat exchanger 344.

The first main damper 351 is disposed in the first main air channel 331 between the return-air inlet 321 and the first heat exchanger 341. More specifically, the first main damper 351 is arranged between the point where the first main air channel 331 and the exhaust ventilation channel 334 diverge and the point where the first main air channel 331 and the supply ventilation channel 333 merge. Thus, the first main damper 351 is configured to regulate a flow of the first passing air 611. It should be noted that regulating a flow of air in one or more embodiments may include regulating a flow rate of the air in a stepwise or non-stepwise manner, regulating a flow ratio of the air with respect to other air in a stepwise or non-stepwise manner, and/or switching whether flowing the air or not.

The second main damper 352 is disposed in the second main air channel 332 between the outside-air inlet 323 and the first heat exchanger 341. More specifically, the second main damper 352 is arranged between the point where the second main air channel 332 and the supply ventilation channel 333 diverge and the point where the second main air channel 332 and the exhaust ventilation channel 334 merge. Thus, the second main damper 352 is configured to regulate a flow of the second passing air 612.

The second sub damper 353 is disposed in the supply ventilation channel 333 i.e. between the outside-air inlet 323 and the total heat exchanger 344. More specifically, the second sub damper 353 is arranged between the point where the second main air channel 332 and the supply ventilation channel 333 diverge and the third fan 347. Thus, the second sub damper 353 is configured to regulate a flow of the ventilation intake air 613.

The exhaust bypass damper 354 is disposed in the exhaust bypass channel 335 at the inner aperture 315. Thus, the exhaust bypass damper 354 is configured to regulate a flow of the exhaust bypass air 615.

The regulation of one of the air flows would influence another one of the air flows. Thus, it can also be said that each of the first main damper 351, the second main damper 352, the second sub damper 353 and the exhaust bypass damper 354 is a part of an airflow regulator 350 (see FIG. 6) which is configured to regulate the air flows in the air-conditioner 300. Further, it can be said that each of the first fan 345, the second fan 346 and the third fan 347 also comprises the airflow regulator 350 for the same reason.

The air-conditioner 300 may further have an electrical pre-heater 348. The electrical pre-heater 348 is disposed in the supply ventilation channel 333 between the outside-air inlet 323 and the total heat exchanger 344. More specifically, the electrical pre-heater 348 is arranged between the third fan 347 and the inlet of the first air paths of the total heat exchanger 344. The electrical pre-heater 348 is configured to heat up air passing therethrough when the first heat exchanger 341 functions as a condenser.

Figure 4:
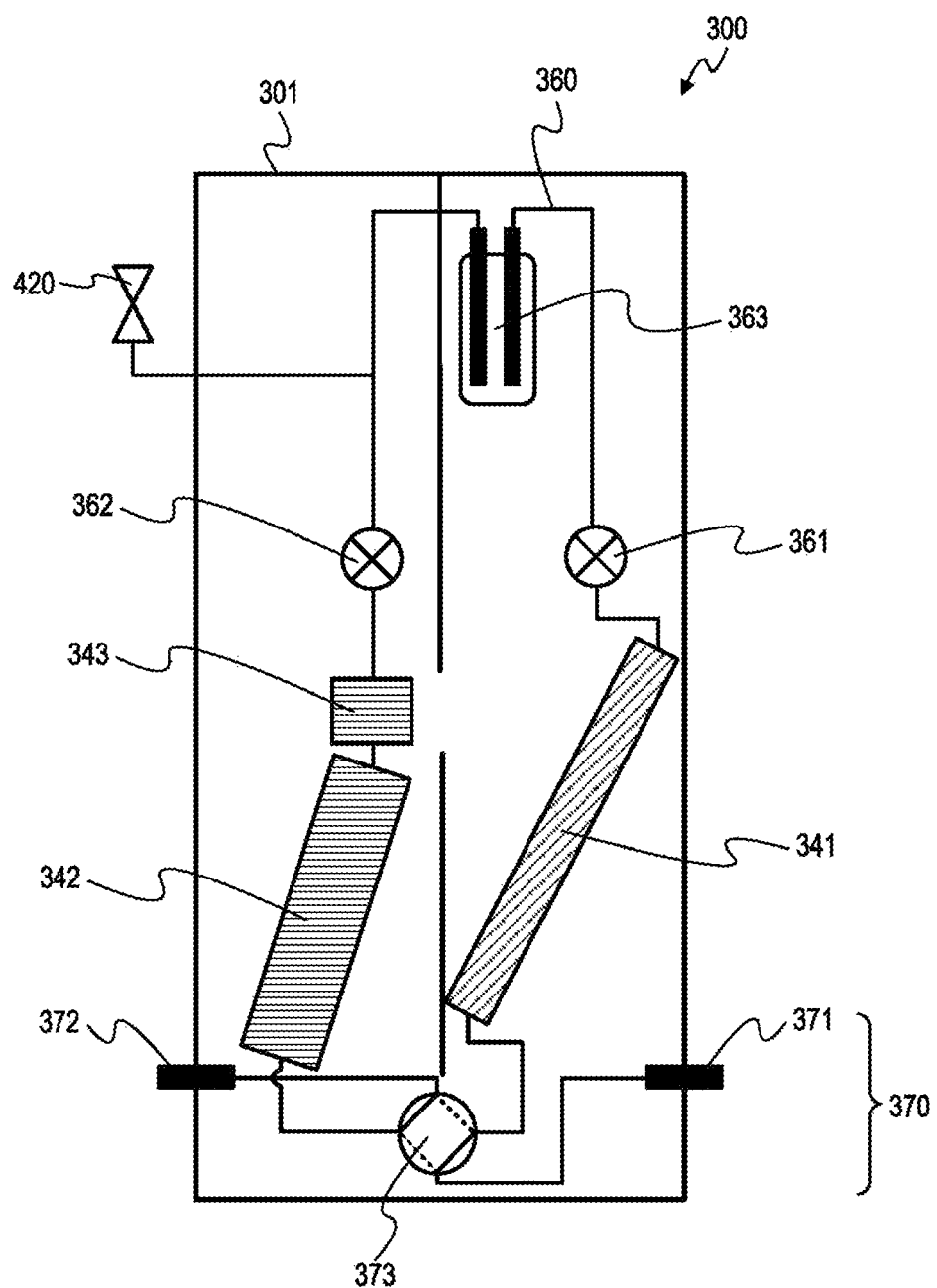
FIG. 4 is a schematic piping diagram of the air-conditioner.

FIG. 4 is a schematic piping diagram of the air-conditioner 300.

The air-conditioner 300 has a pipe connecting mechanism 370, a liquid refrigerant pipe 360, first and second expansion valves 361, 362, a receiver 363 and a release valve 420.

The pipe connecting mechanism 370 is configured to connect each of the first heat exchanger 341 and the second heat exchanger 342, 343 (the second main heat exchanger 342 and the second sub heat exchanger 343) to the refrigerant compressor system 400 (see FIG. 1). Thus, the pipe connecting mechanism 370 is configured to connect the first heat exchanger 341 and the second heat exchanger 342, 343 to the compressor unit 410 which is disposed outside the housing 301 of any one of the air-conditioners 300, via the high-pressure gas refrigerant pipe 430 and the low-pressure gas refrigerant pipe 440.

The pipe connecting mechanism 370 includes a high-pressure gas refrigerant port 371, a low-pressure gas refrigerant port 372, and a four-way valve 373 as a switching mechanism.

The high-pressure gas refrigerant port 371 is configured to connect the four-way valve 373 to a high-pressure gas refrigerant pipe 430 (see FIG. 5) of the refrigerant compressor system 400. The low-pressure gas refrigerant port 372 is configured to connect the four-way valve 373 to a low-pressure gas refrigerant pipe 440 (see FIG. 5) of the refrigerant compressor system 400.

The four-way valve 373 may be a motor valve with four pipe connecting ports. The four-way valve 373 is connected to each of the first heat exchanger 341 and the second heat exchanger 342, 343. Thus, the four-way valve 373 is configured to switch the state of the air-conditioner 300 between a cooling mode connection state and a heating mode connection state.

Here, the cooling mode connection state is a state in which the first heat exchanger 341 is connected to the low-pressure gas refrigerant pipe 440 and the second heat exchanger 342, 343 is connected to the high-pressure gas refrigerant pipe 430. With the cooling mode connection state, a cooling operation can be achieved in the air-conditioner 300. The cooling operation is an operation in which the first heat exchanger 341 functions as an evaporator of a heat pump circuit and the second heat exchanger 342, 343 functions as a condenser of a heat pump circuit.

Whereas, the heating mode connection state is a state in which the first heat exchanger 341 is connected to the high-pressure gas refrigerant pipe 430 and the second heat exchanger 342, 343 is connected to the low-pressure gas refrigerant pipe 440. With the heating mode connection state, a heating operation can be achieved in the air-conditioner 300. The heating operation is an operation in which the first heat exchanger 341 functions as a condenser of a heat pump circuit and the second heat exchanger 342, 343 functions as an evaporator of a heat pump circuit.

The liquid refrigerant pipe 360 connects the second main heat exchanger 342, the second sub heat exchanger 343 and the first heat exchanger 341 in series in this order, on the opposite side with respect to the side in which the four-way valve 373 is connected to the first heat exchanger 341 and the second heat exchanger 342, 343. Thus, the liquid refrigerant pipe 360 is configured such that refrigerant flows in the second main heat exchanger 342, the second sub heat exchanger 343 and the first heat exchanger 341 in series in this order and/or in the reverse order.

Hence, the first heat exchanger 341, the second heat exchanger 342 343, the refrigerant compressor system 400, and the liquid refrigerant pipe 360 form a heat pump circuit.

Here, the term "a heat pump circuit" means a system configured to transfer heat energy from an ambient region of an evaporator to an ambient region of a condenser by circulating refrigerant as heat medium between the evaporator and the condenser. The "heat pump circuit" may have at least a refrigerant compressor, a condenser, an expansion valve, and an evaporator connected in series in this order. The refrigerant compressor is configured to pressurize and circulate the refrigerant through the refrigerant circuit. The condenser is configured to cause heat release by the refrigerant discharged from the refrigerant compressor. The expansion valve is configured to cause depressurization of the refrigerant discharged from the condenser. The evaporator is configured to cause heat absorption by the refrigerant discharged from the expansion valve and send the refrigerant towards the refrigerant compressor.

The first and second expansion valves 361, 362 are disposed in the liquid refrigerant pipe 360. The first and second expansion valves 361, 362 may be solenoid valves. The first expansion valve 361 is arranged closer to the first heat exchanger 341 than the second expansion valve 362 to control an amount of refrigerant released into the first heat exchanger 341 when the first heat exchanger 341 functions as an evaporator. The second expansion valve 362 is arranged closer to the second heat exchanger 342, 343 than the first expansion valve 361 to control an amount of refrigerant released into the second heat exchanger 342, 343 when the second heat exchanger 342, 343 functions as an evaporator.

The receiver 363 is disposed in the liquid refrigerant pipe 360 between the first expansion valve 361 and the second expansion valve 362. The receiver 363 is configured to absorb fluctuations in amount of refrigerant circulating in the heat pump circuit.

Thus, the first heat exchanger 341 and the second main heat exchanger 342 can function a set of a condenser and an evaporator in the same refrigerant circuit. Not only that, function of each of the first heat exchanger 341 and the second main heat exchanger 342 can switch between an evaporator and a condenser.

It should be noted that the second sub heat exchanger 343 is configured to flow refrigerant therein that has flown through the second main heat exchanger 342 when the second main heat exchanger 342 functions as a condenser. Moreover, the second main heat exchanger 342 is configured to flow refrigerant therein that has flown through the second sub heat exchanger 343 when the second main heat exchanger 342 functions as an evaporator.

The release valve 420 may be a solenoid valve with a function as a safety valve. The release valve 420 is connected to the liquid refrigerant pipe 360 and configured to discharge the refrigerant in the heat pump circuit from the liquid refrigerant pipe 360 by opening. The release valve 420 may be arranged in the outside 230 of the building 200 (see FIG. 1). In this case, a pipe may be branched from the liquid refrigerant pipe 360 to the outside 230 for connecting the release valve 420 in the outside 230 to the liquid refrigerant pipe 360.

Figure 5:
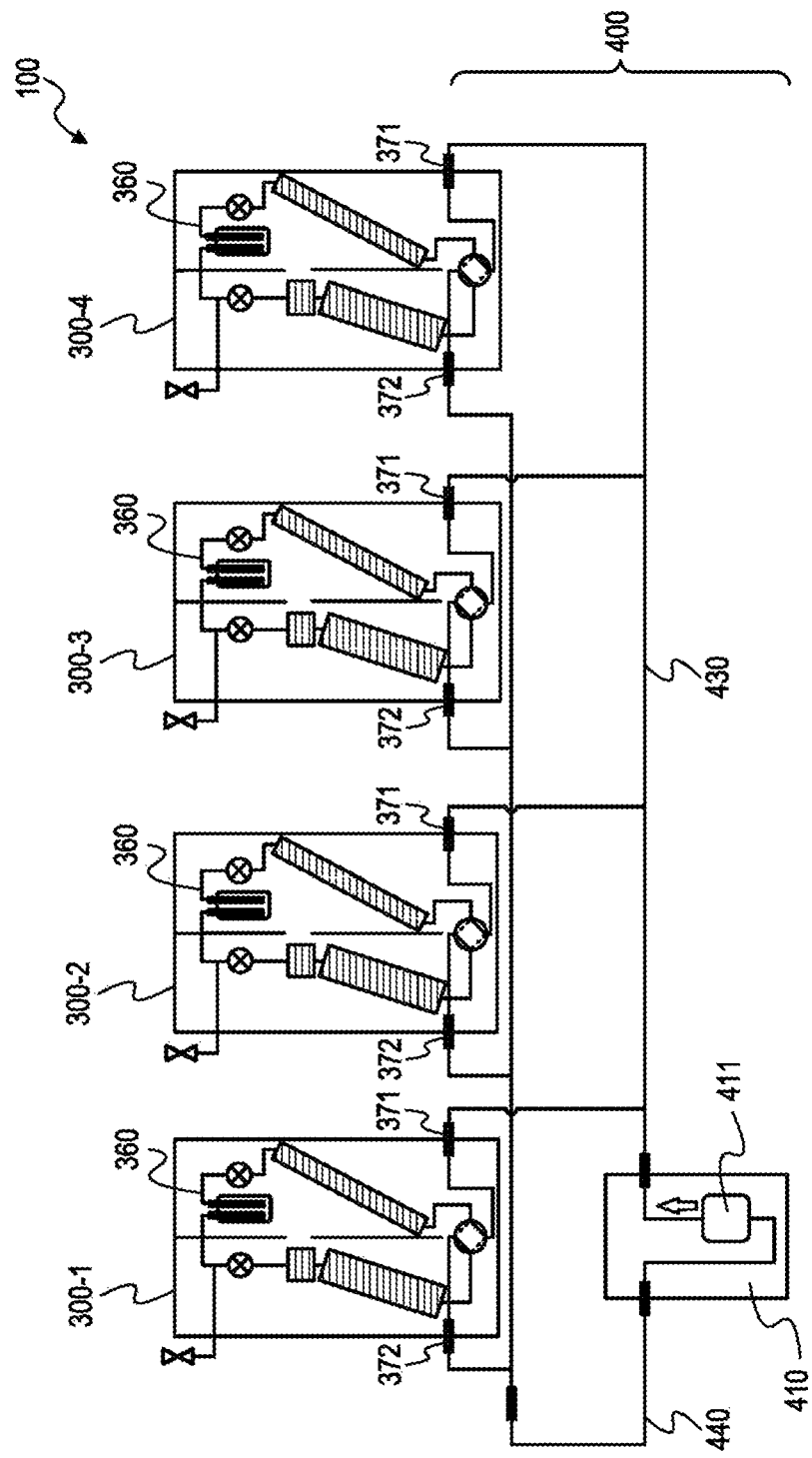
FIG. 5 is a schematic piping diagram of the air-conditioning system.

FIG. 5 is a schematic piping diagram of the air-conditioning system 100.

As mentioned above, the air-conditioning system 100 includes the plurality of the air-conditioners 300 and the refrigerant compressor system 400. The refrigerant compressor system 400 includes the compressor unit 410, the high-pressure gas refrigerant pipe 430, and the low-pressure gas refrigerant pipe 440.

The compressor unit 410 has at least one of refrigerant compressor 411. The refrigerant compressor 411 is configured to take in a refrigerant from the suction side, compress the refrigerant taken in, and discharge the compressed refrigerant from the discharge side. The compressor unit 410 may have a housing accommodating substantially all the other components of the compressor unit 410.

The high-pressure gas refrigerant pipe 430 is connected to the discharge side of the refrigerant compressor 411. The high-pressure gas refrigerant pipe 430 is branched towards and connected to the air-conditioners 300. The branched high-pressure gas refrigerant pipes 430 are connected to the high-pressure gas refrigerant ports 371 of the air-conditioners 300, respectively. The low-pressure gas refrigerant pipe 440 is connected to the suction side of the refrigerant compressor 411. The low-pressure gas refrigerant pipe 440 is branched towards and connected to the air-conditioners 300. The branched low-pressure gas refrigerant pipes 440 are connected to the low-pressure gas refrigerant ports 372 of the air-conditioners 300, respectively.

Hence, each of the air-conditioners 300 and the refrigerant compressor system 400 form a heat pump circuit. At least the compressor unit 410 is shared by the plurality of air-conditioners 300. In addition, at least a part of the high-pressure gas refrigerant pipe 430 and a part of the low-pressure gas are also shared by the plurality of air-conditioners 300. Thus, a two-pipe system of refrigerant piping is achieved.

Particularly when carbon dioxide refrigerant is used, refrigerant piping needs to be thick since the pressure of refrigerant is relatively high. On this point, by using a two-pipe system like the above, it is possible to reduce the total length of piping and simplify the piping connections. Hence, the effect such as cost reduction and space reduction of piping becomes more remarkable.

The compressor unit 410 may have an accumulator (not shown) that is fluidly connected the gas refrigerant pipe and configured to separate the liquid refrigerant and the gas refrigerant.

Figure 6:
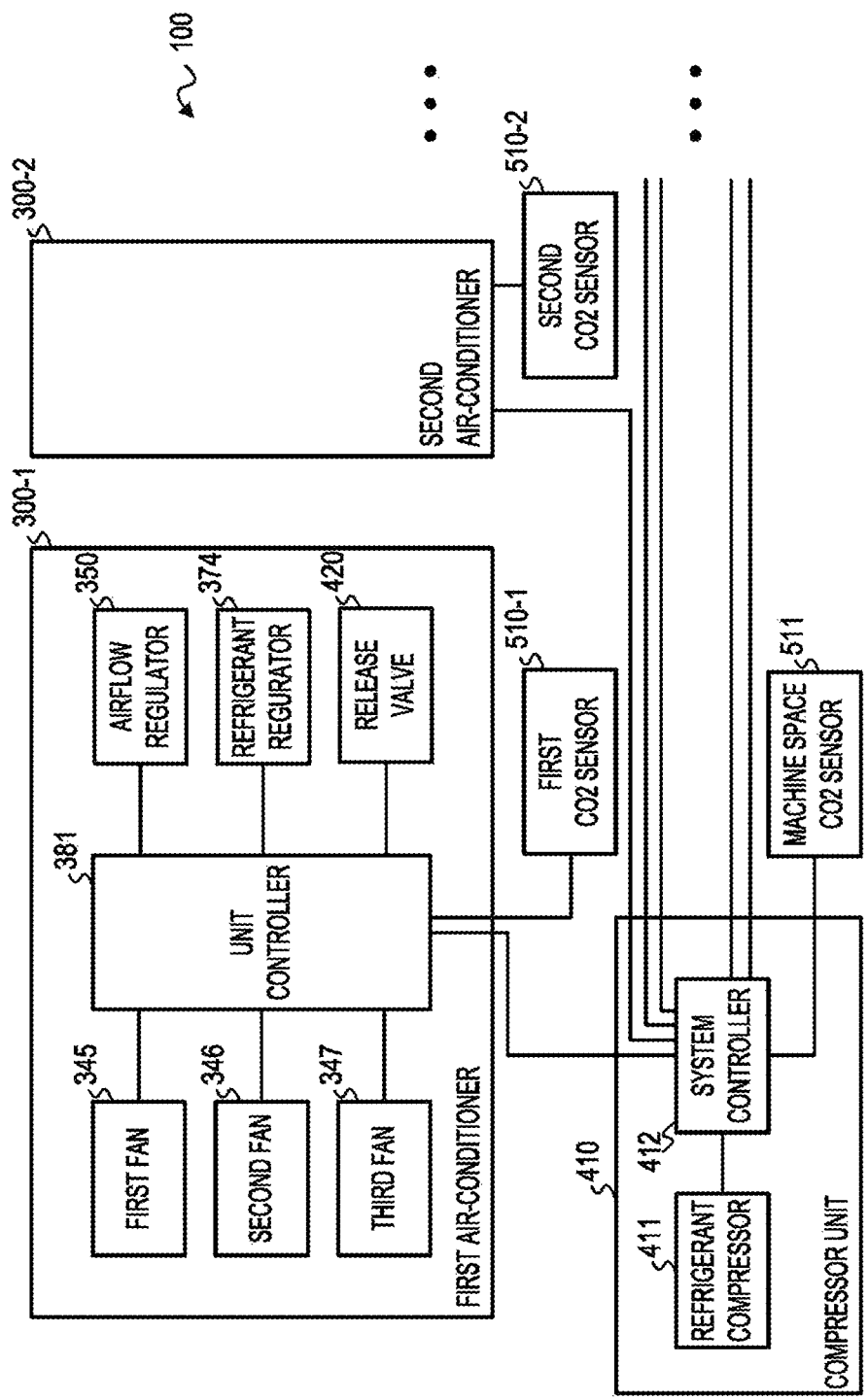
FIG. 6 is a block diagram indicating a functional configuration of the air-conditioning system.

FIG. 6 is a block diagram indicating a functional configuration of the air-conditioning system 100.

As mentioned above, the air-conditioning system 100 includes the room CO2 sensors 510, the machine space CO2 sensor 511, the air-conditioners 300, and the compressor unit 410. The air-conditioner 300 has the airflow regulator 350, a refrigerant regulator 374 and a unit controller 381. The compressor unit 410 has the refrigerant compressor 411, a system controller 412 and a system storage 413.

The room CO2 sensor 510 is configured to detect a carbon dioxide level in the predetermined space 220 and send the CO2 information indicating the detected carbon dioxide level to the unit controller 381. The machine space CO2 sensor 511 is configured to detect a carbon dioxide level in the machine space 210 and send the CO2 information indicating the detected carbon dioxide level to the system controller 412. The carbon dioxide level may be a value of carbon dioxide concentration in the air, or an index value among predetermined values corresponding to predetermined ranges of the carbon dioxide concentration.

The room CO2 sensor 510 may send the CO2 information directly to the unit controller 381 of the corresponding air-conditioner 300 and/or to the system controller 412. The room CO2 sensor 510 may also send the CO2 information indirectly to the unit controller 381 via the system controller 412, and/or indirectly to the system controller 412 via the unit controller 381. The same may be applied to the machine space CO2 sensor 511. Each of the room CO2 sensors 510 and the machine space CO2 sensor 511 may send the CO2 information by a wired communication and/or a wireless communication.

The airflow regulator 350 includes the first main damper 351, the second main damper 352, the second sub damper 353 and the exhaust bypass damper 354 (see FIG. 3). Thus, the airflow regulator 350 is configured to regulate a flow of each of the first passing air 611, the second passing air 612, the ventilation intake air 613, the ventilation exhaust air 614 and the exhaust bypass air 615.

The refrigerant regulator 374 is configured to regulate a circulation amount of refrigerant in the second heat exchanger 342, 343, the liquid refrigerant pipe 360 and the first heat exchanger 341. The refrigerant regulator 374 is also configured to switch whether carbon dioxide refrigerant flows in the above elements. It should be noted that regulating a circulation amount of refrigerant in one or more embodiments may include regulating a flow rate of the refrigerant, and/or switching whether flowing the refrigerant or not.

The refrigerant regulator 374 may include solenoid valves (not shown) arranged in the heat pump circuit and close to the high-pressure gas refrigerant port 371 and the low-pressure gas refrigerant port 372, respectively, and/or the four-way valve 373 (see FIG. 4). The refrigerant regulator 374 may also be configured to control an open degree of each of the first expansion valve 361 and the second expansion valve 362. The refrigerant regulator 374 may also control a rotational frequency of the refrigerant compressor 411 by sending an instruction signal to the system controller 412 and/or the unit controller 381.

The unit controller 381 is configured to control the operation of the air-conditioner 300. More specifically, the unit controller 381 is configured to control at least the first fan 345, the second fan 346, the third fan 347, the airflow regulator 350 and the refrigerant regulator 374. Thereby, the unit controller 381 switches the state of the air-conditioner 300 among a plurality of predetermined operation states of the air-conditioner 300. The details about the predetermined operation states are explained later. The unit controller 381 is also configured to acquire CO2 information sent from at least the corresponding room CO2 sensor 510. The unit controller 381 may be also configured to acquire CO2 information sent from the other room CO2 sensors 510 and the machine space CO2 sensor 511. The unit controller 381 is configured to perform the above operation control according to the acquired CO2 information.

The unit controller 381 includes an arithmetic circuit such as a CPU (Central Processing Unit), a work memory used by the CPU, such as a RAM (Random Access Memory), and a recording medium storing control programs and information used by the CPU, such as a ROM (Read Only Memory), although they are not shown. Thus, unit controller 381 is configured to perform information processing and signal processing by the CPU executing the control programs to control the operation of the air-conditioner 300.

The system controller 412 is configured to control the operation of the air-conditioning system 100, including the output (rotation speed) of the refrigerant compressor 411. The system controller 412 is configured to acquire the CO2 information sent from each of the room CO2 sensors 510 and the machine space CO2 sensor 511, and control the release valves 420 according to the CO2 information. The system controller 412 includes an arithmetic circuit, a work memory used by the CPU, and a recording medium storing control programs and information used by the CPU. Thus, the system controller 412 is configured to perform information processing and signal processing by the CPU executing the control programs to control the operation of the compressor unit 410.

<Operation States of Air-Conditioner>

The above-mentioned predetermined operation states of the air-conditioner 300 includes a heat-reclaiming standard state, a no-heat-reclaiming standard state, a low-ventilation state, an air-conditioning state, a low-cooling state, a free-cooling state and a refrigerant-evacuation state.

The details of these operation states are explained hereinafter with reference to the drawings FIGS. 7 to 13. In these figures, the narrow-broken lines indicates that the corresponding components are not in operation, the arrows substantially indicate the paths and directions of major air flows. The explanations on the air flows are made on the premise that the predetermined space 220 is substantially airtight. It should be noted that there may also be minor air flows flowing in the air-conditioner 300 other than the depicted air flows due to air leak or the like.

Figure 7:
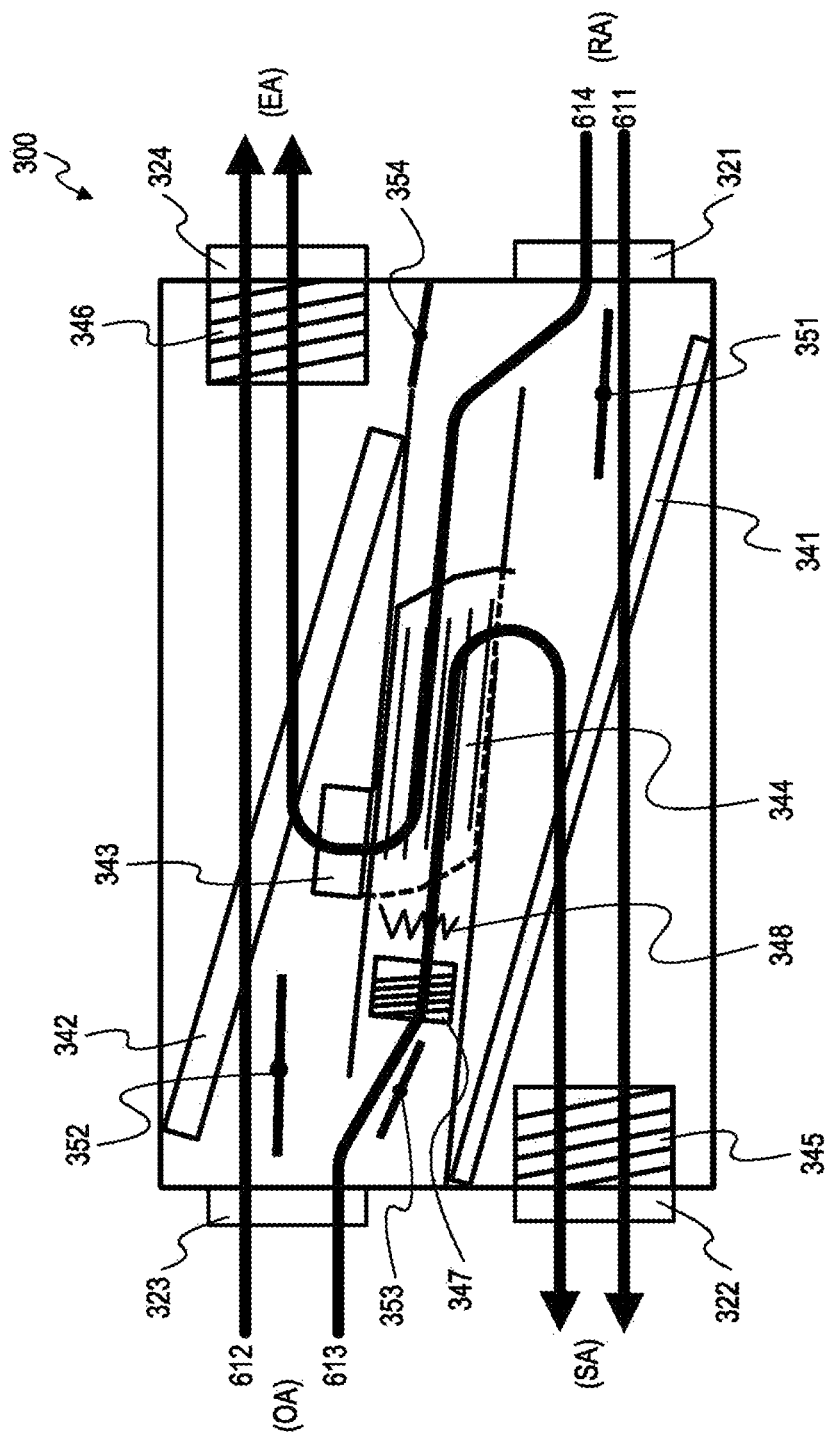
FIG. 7 is a schematic diagram indicating a heat-reclaiming standard state of the air-conditioner.

FIG. 7 is a schematic diagram indicating the heat-reclaiming standard state of the air-conditioner 300.

As shown in FIG. 7, the heat-reclaiming standard state is a state in which the first passing air 611, the second passing air 612, the ventilation intake air 613 and the ventilation exhaust air 614 are allowed to flow, the exhaust bypass air 615 (see FIG. 3) is prevented from flowing, the first fan 345 and the second fan 346 are allowed to operate, and the refrigerant is allowed to flow in the first heat exchanger 341, the second sub heat exchanger 343 and the second main heat exchanger 342. The third fan 347 may also be allowed to operate. The pre-heater 348 may be allowed to operate when the air-conditioner 300 is in the heating mode connection state, i.e. when the air-conditioner 300 performs a heating of the predetermined space 220.

In this heat-reclaiming standard state, the air-conditioner 300 can perform an air-conditioning and a ventilation of the predetermined space 220 while reclaiming at least a part of hot heat and/or cold heat of the ventilation exhaust air 614 for heating up and/or cooling down the ventilation intake air 613.

Figure 8:
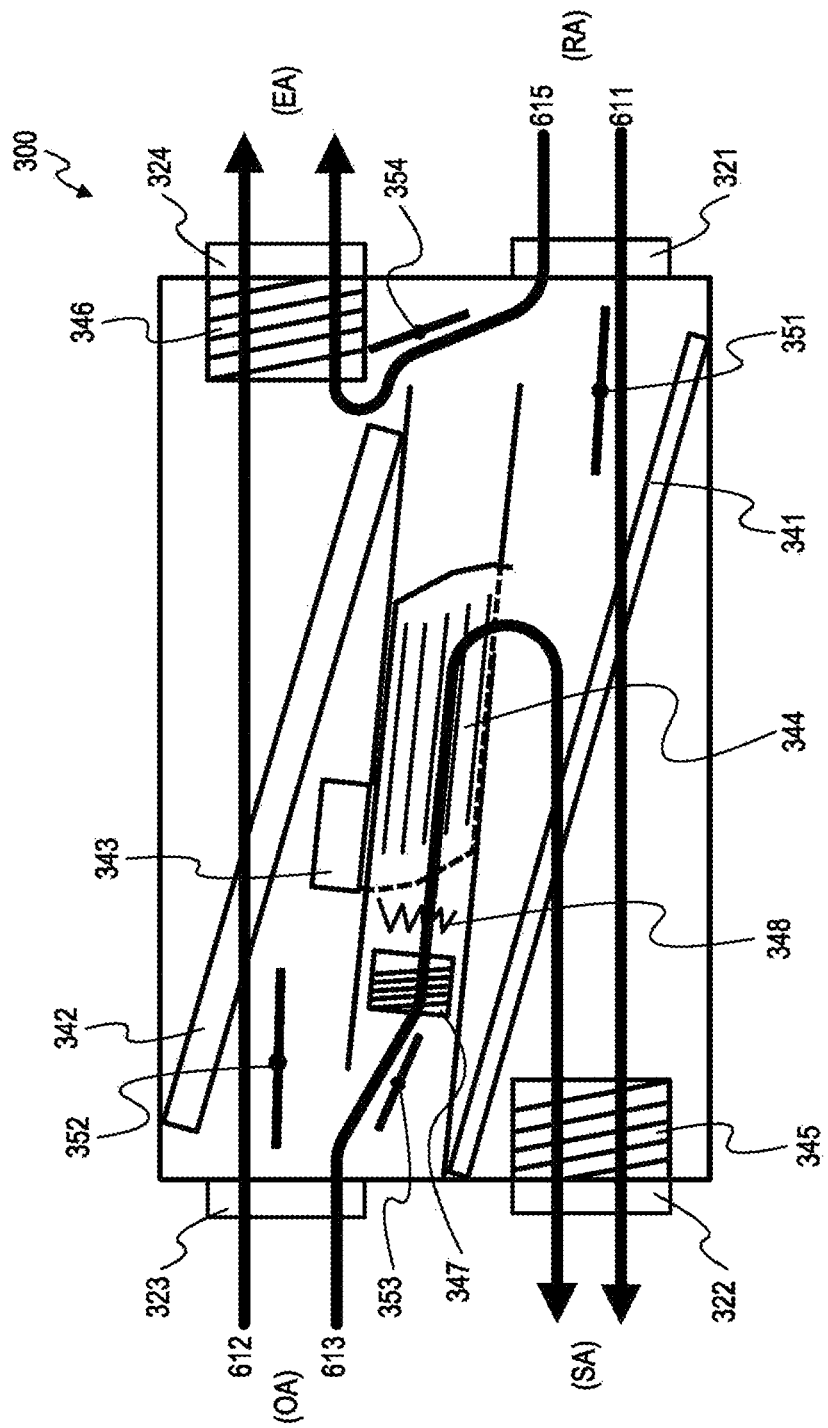
FIG. 8 is a schematic diagram indicating a no-heat-reclaiming standard state of the air-conditioner.

FIG. 8 is a schematic diagram indicating the no-heat-reclaiming standard state of the air-conditioner 300.

As shown in FIG. 8, the no-heat-reclaiming standard state is a state in which the first passing air 611, the second passing air 612, the ventilation intake air 613 and the exhaust bypass air 615 is allowed to flow, the first fan 345 and the second fan 346 are allowed to operate, and the refrigerant is allowed to flow in the first heat exchanger 341, the second sub heat exchanger 343 and the second main heat exchanger 342. The third fan 347 may also be allowed to operate. The pre-heater 348 may be allowed to operate when the air-conditioner 300 performs a heating of the predetermined space 220. Although the ventilation exhaust air 614 (see FIG. 3) would flow, the flow is small since the frictional resistance by the total heat exchanger 344, the second sub heat exchanger 343 and the second main heat exchanger 342 is much higher than the frictional resistance by the opening exhaust bypass damper 354.

In this no-heat-reclaiming standard state, the air-conditioner 300 can perform an air-conditioning and a ventilation of the predetermined space 220 while flowing the exhaust bypass air 615. It can also be said that at least a part of the ventilation exhaust air 614 is bypassed so as not to pass through the total heat exchanger 344.

Figure 9:
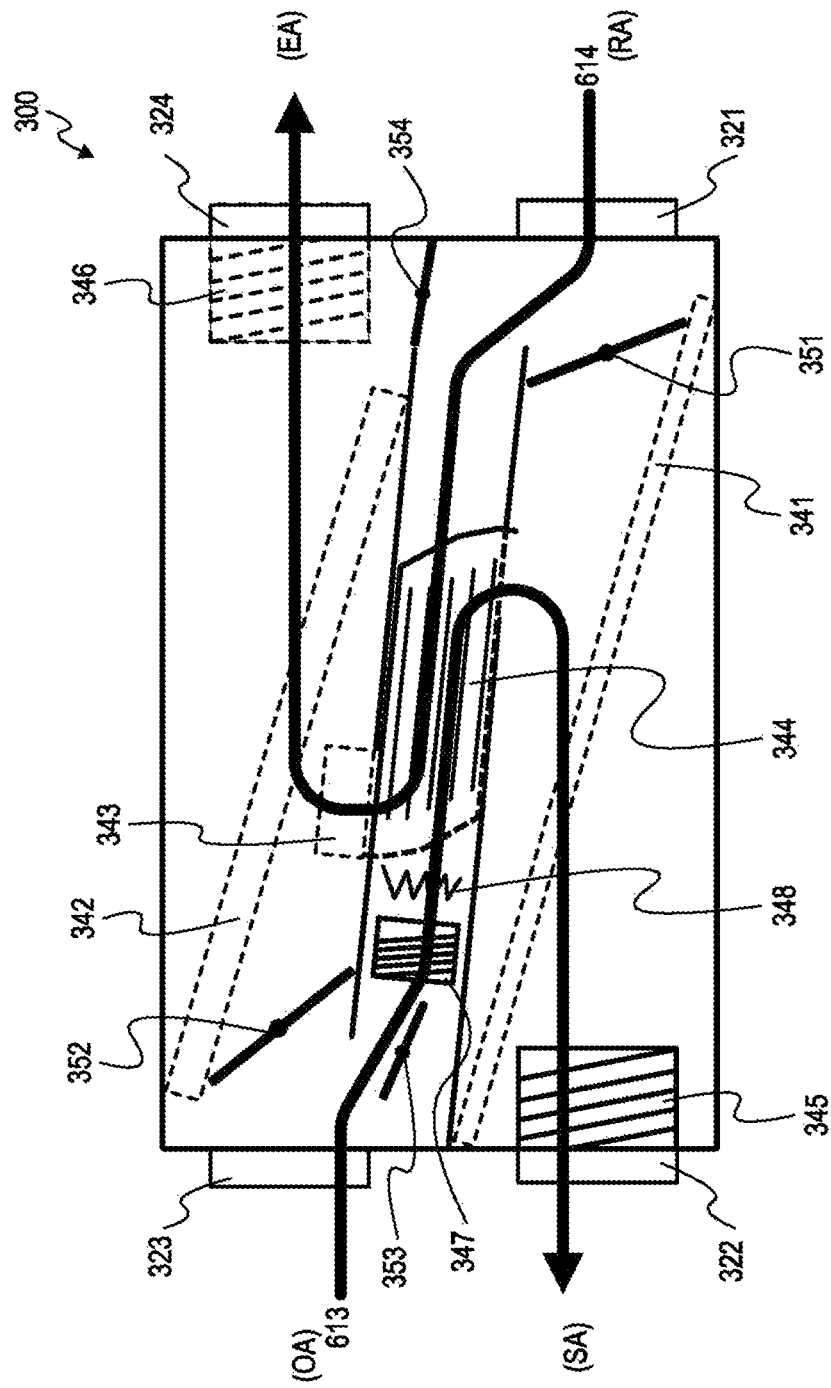
FIG. 9 is a schematic diagram indicating a low-ventilation state of the air-conditioner.

FIG. 9 is a schematic diagram indicating the low-ventilation state of the air-conditioner 300.

As shown in FIG. 9, the low-ventilation state is a state in which the ventilation exhaust air 614 and the ventilation intake air 613 are allowed to flow, the first passing air 611, the second passing air 612 and the exhaust bypass air 615 are prevented from flowing, the first fan 345 is allowed to operate, and the refrigerant is prevented from flowing in the first heat exchanger 341, the second sub heat exchanger 343 and the second main heat exchanger 342. The third fan 347 and the pre-heater 348 may also be allowed to operate. Since the required ventilation performance is low, the second fan 346 may be stopped.

In this low-ventilation state, the air-conditioner 300 can perform a ventilation of the predetermined space 220 while reclaiming at least a part of hot heat and/or cold heat of the ventilation exhaust air 614 for heating up and/or cooling down the ventilation intake air 613.

Figure 10:
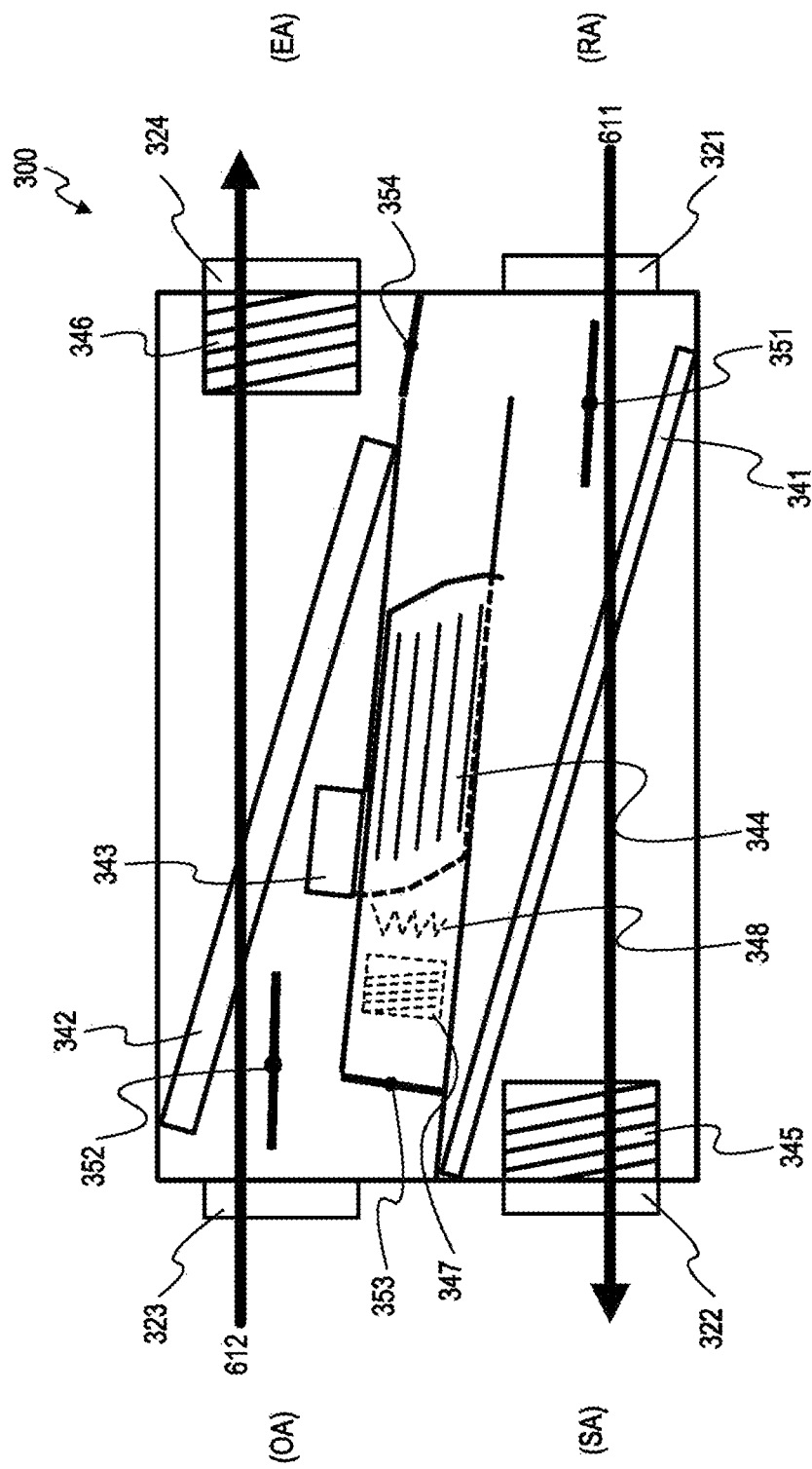
FIG. 10 is a schematic diagram indicating an air-conditioning state of the air-conditioner.

FIG. 10 is a schematic diagram indicating the air-conditioning state of the air-conditioner 300.

As shown in FIG. 10, the air-conditioning state is a state in which the first passing air 611 and the second passing air 612 are allowed to flow, the ventilation intake air 613, the ventilation exhaust air 614 and the exhaust bypass air 615 are prevented from flowing, the first fan 345 and the second fan 346 are allowed to operate, and the refrigerant is allowed to flow in the first heat exchanger 341, the second sub heat exchanger 343 and the second main heat exchanger 342. The third fan 347 and the electrical pre-heater 348 may be stopped.

In this air-conditioning state, the air-conditioner 300 can perform an air-conditioning of the predetermined space 220 without taking in the outside air into the predetermined space 220. Here, the outside air means an air which is drawn into the air-conditioner 300 from the outside-air inlet 323.

Figure 11:
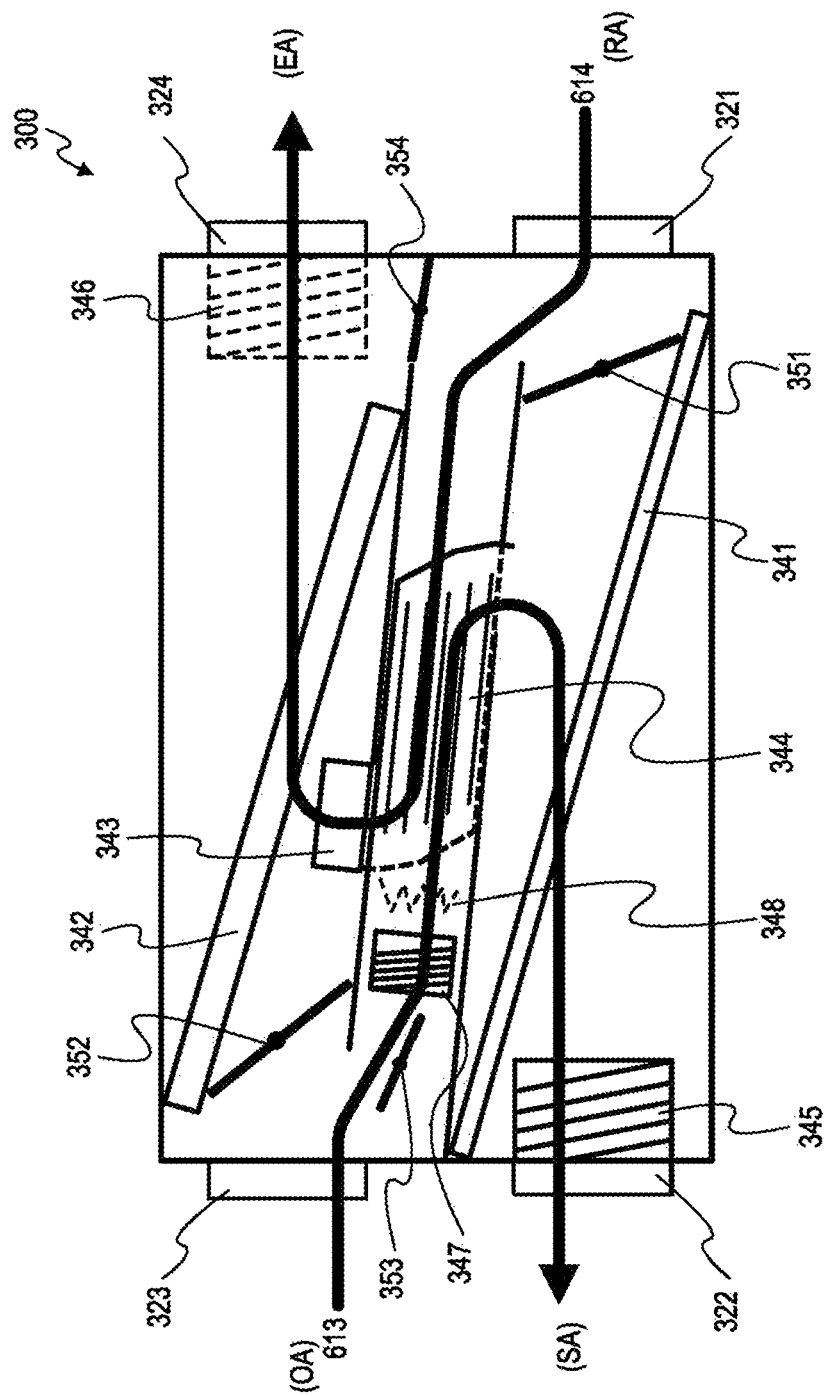
FIG. 11 is a schematic diagram indicating a low-cooling state of the air-conditioner.

FIG. 11 is a schematic diagram indicating the low-cooling state of the air-conditioner 300.

As shown in FIG. 11, the low-cooling state is a state in which the ventilation intake air 613 and the ventilation exhaust air 614 are allowed to flow, the first passing air 611, the second passing air 612 and the exhaust bypass air 615 are prevented from flowing, the first fan 345 is allowed to operate, and the refrigerant is allowed to flow in the first heat exchanger 341, the second sub heat exchanger 343 and the second main heat exchanger 342. The third fan 347 may also be allowed to operate. Since the required ventilation performance is low, the second fan 346 may be stopped.

In this low-cooling state, the air-conditioner 300 can perform a ventilation of the predetermined space 220 while flowing the ventilation exhaust air 614. Thus, air-conditioning can be performed without using the first passing air 611 and the second passing air 612.

Figure 12:
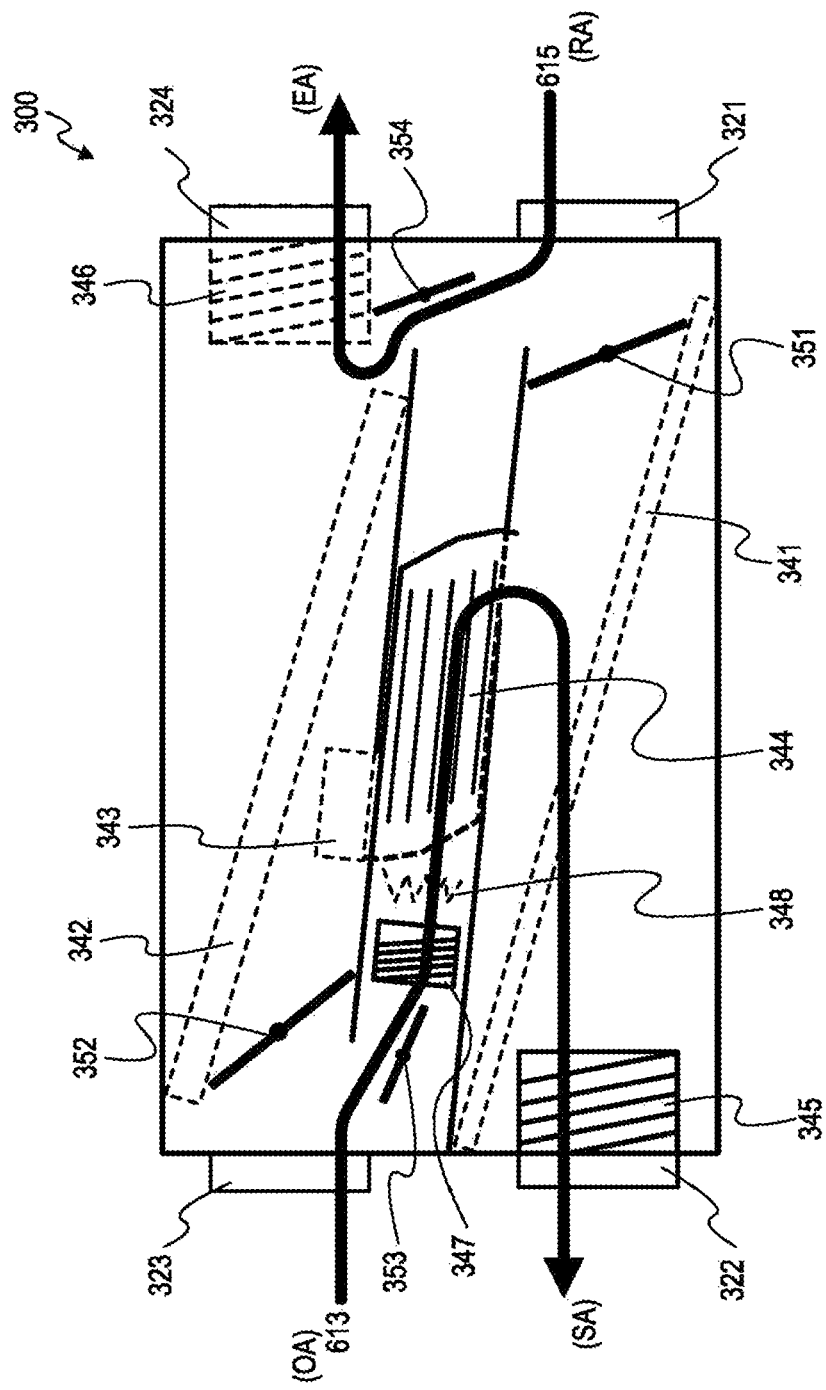
FIG. 12 is a schematic diagram indicating a free-cooling state of the air-conditioner.

FIG. 12 is a schematic diagram indicating the free-cooling state of the air-conditioner 300.

As shown in FIG. 12, the free-cooling state is a state in which the first passing air 611 and the second passing air 612 are prevented from flowing, the ventilation intake air 613 and the exhaust bypass air 615 are allowed to flow, the first fan 345 is allowed to operate, and the refrigerant is prevented from flowing in the first heat exchanger 341, the second sub heat exchanger 343 and the second main heat exchanger 342. The third fan 347 may also be allowed to operate. Since the required ventilation performance is low, the second fan 346 may be stopped. The flow of the ventilation exhaust air 614 (see FIG. 3) is small as mentioned above.

In this free-cooling state, the air-conditioner 300 can perform a free cooling and a ventilation of the predetermined space 220 while flowing the exhaust bypass air 615.

Figure 13:
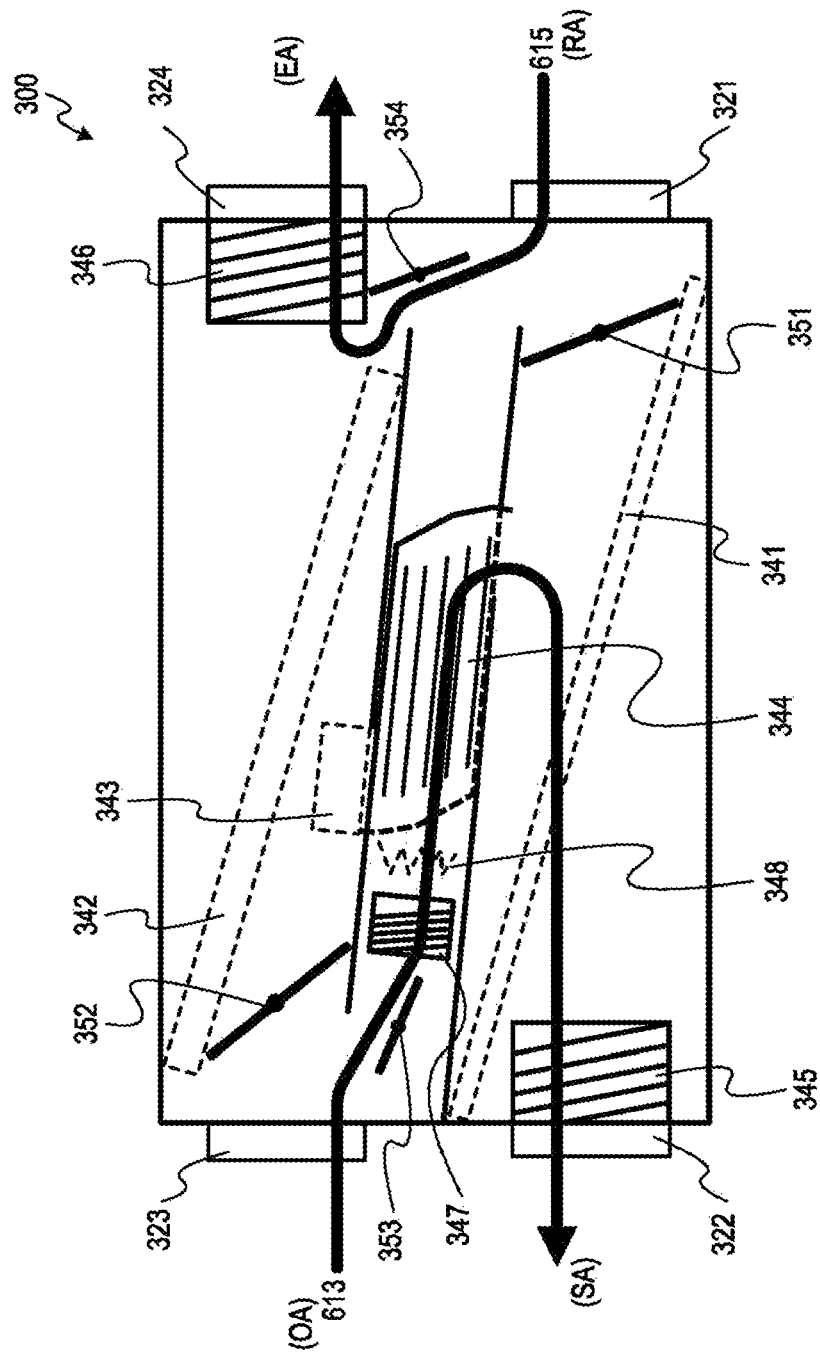
FIG. 13 is a schematic diagram indicating a refrigerant-evacuation state of the air-conditioner.

FIG. 13 is a schematic diagram indicating the refrigerant-evacuation state of the air-conditioner 300.

As shown in FIG. 13, the refrigerant-evacuation state is a state in which the ventilation intake air 613 and the exhaust bypass air 615 are allowed to flow, the first passing air 611 and the second passing air 612 are prevented from flowing, the second fan 346, the third fan 347 and the first fan 345 operate, and the refrigerant is prevented from flowing in the first heat exchanger 341, the second sub heat exchanger 343 and the second main heat exchanger 342. It can be said that at least a part of the ventilation exhaust air 614 is allowed to flow into the exhaust bypass channel 335. The flow of the ventilation exhaust air 614 (see FIG. 3) is small as mentioned above.

In this refrigerant-evacuation state, the air-conditioner 300 can perform a forcible ventilation of the predetermined space 220 while flowing the exhaust bypass air 615.

<Switching of Operation States>

The unit controller 381 of the air-conditioner 300 is configured to switch the state of the air-conditioner 300 among the above-mentioned predetermined operation states according to a designation of the operation state of the air-conditioner 300 and/or a condition related to the predetermined space 220. Such a designation and/or condition may be the target temperature of the predetermined space 220, the actual temperature of the predetermined space 220, the temperature of the outside air, whether or not the predetermined space 220 is in use, or the like. The designation of the operation state of the air-conditioner 300 can be made by a user via a user interface such as a touch panel.

The unit controller 381 may control the first fan 345, the second fan 346, the third fan 347, the airflow regulator 350 and the refrigerant regulator 374 such that the refrigerant-evacuation state (FIG. 13) is achieved when the carbon dioxide level indicated by the CO2 information is higher than or equal to a first predetermined threshold. The first predetermined threshold may be the carbon dioxide level with which leakage of carbon dioxide refrigerant is suspected.

The unit controller 381 may switch a state of the air-conditioner 300 to the refrigerant-evacuation state (FIG. 13) on condition that the carbon dioxide level has kept higher than or equal to the first predetermined threshold for a predetermined amount of time.

The unit controller 381 may control the first fan 345, the second fan 346, the third fan 347, the airflow regulator 350 and the refrigerant regulator 374 such that the low-ventilation state (FIG. 9) is achieved when the carbon dioxide level is lower than the first predetermined threshold and higher than or equal to a second predetermined threshold. The second predetermined threshold is lower than the first predetermined threshold. The second predetermined threshold may be the minimum carbon dioxide level undesirable for the human body.

It can be said that the unit controller 381 is configured to switch at least a standard state, a ventilation state and the air-conditioning state (FIG. 10). The standard state is a state in which the first passing air 611, the second passing air 612, the ventilation intake air 613 and the ventilation exhaust air 614 are allowed to flow, the first fan 345 and the second fan 346 are allowed to operate, and the refrigerant is allowed to flow in the first heat exchanger 341 and the second main heat exchanger 342. The ventilation state is a state in which the first passing air 611 and the second passing air 612 are prevented from flowing, the ventilation intake air 613 and the ventilation exhaust air 614 are allowed to flow, the first fan 345 is allowed to operate, and the refrigerant is prevented from flowing in the first heat exchanger 341 and the second main heat exchanger 342.

In this case, the above-mentioned heat-reclaiming standard state (FIG. 7) and above-mentioned no-heat-reclaiming standard state (FIG. 8) are included in the standard state, and the above-mentioned low-ventilation state (FIG. 9), free-cooling state (FIG. 12), and refrigerant-evacuation state (FIG. 13) are included in the ventilation state.

It can also be said that the unit controller 381 is configured to, in the above ventilation state, switch at least a normal ventilation state in which the exhaust bypass air 615 is prevented from flowing and the first fan 345 is allowed to operate, and the refrigerant-evacuation state (FIG. 13). In this case, the above-mentioned low-ventilation state (FIG. 9) may be included in the normal ventilation state.

The unit controller 381 may select the no-heat-reclaiming standard state (FIG. 8) and the low-cooling state (FIG. 11) when the air-conditioner 300 is in the cooling mode connection state, i.e. when the air-conditioner 300 performs a cooling of the predetermined space 220, and the cooling load is relatively low.

The unit controller 381 may select the free-cooling state (FIG. 12) on condition the air-conditioner 300 performs a cooling of the predetermined space 220, and the temperature of the outside air is much lower than the temperature of the inside air in the predetermined space 220.

When it has been detected that the total heat exchanger 344 is malfunctioning or predicted to malfunction due to freezing, clogging or the like, the unit controller 381 may select an operation state in which the exhaust bypass damper 354 is open, e.g. the no-heat-reclaiming standard state (FIG. 8), the low-cooling state (FIG. 9), and the refrigerant-evacuation state (FIG. 13). It is possible to detect such situation by using a temperature sensor and/or a pressure sensor disposed to or near the total heat exchanger 344.

The unit controller 381 may output alert information indicating a possibility of leakage of carbon dioxide refrigerant when the carbon dioxide level is higher than or equal to the first predetermined threshold or a third predetermined threshold. The third predetermined threshold may be either higher or lower than the first predetermined threshold. The alert information can be in a form of a sound, a voice message, a light, an image, a vibration, an electric signal sent to an external information processing device, or the like.

The unit controller 381 is further configured to, when the carbon dioxide level is higher than or equal to the first predetermined threshold or a fourth predetermined threshold, control the release valve 420 (see FIG. 4) so as to discharge the refrigerant in the heat pump circuit to the outside 230 of the predetermined space 220. The fourth predetermined threshold may be either higher or lower than the first predetermined threshold. This control may be performed by the system controller 412 of the compressor unit 410 (see FIG. 6)

The critical temperature of carbon dioxide (CO2) as refrigerant is relatively low (31° C.). When an outdoor heat exchanger of an air-conditioner functions as a condenser at high outdoor temperatures, the refrigerant in the outdoor heat exchanger becomes "transcritical." This means that the refrigerant cannot condense to liquid but remains in the gas stage, and would make the amount of heat rejected in the outdoor heat exchanger much smaller than when condensing occurs (as in a "subcritical" condition). As a result, a system using carbon dioxide refrigerant tends to have lower efficiency than a similar system using other refrigerant such as R410A or other HFC. On this point, with the air-conditioner 300, the heat exchange efficiency can be improved in spite of using carbon dioxide refrigerant since the second heat exchanger 342, 343 exchanges heat with the ventilation exhaust air 614 that is cooler than the outside air. Hence, the air-conditioner 300 according to the above-described embodiments is suitable.

The air-conditioner 300 may be configured to switch its operation state such that the temperature of the air which goes through the second heat exchanger (the second main heat exchanger 342 and/or the second sub heat exchanger 343) is under the supercritical temperature of the carbon dioxide refrigerant flowing in the second heat exchanger.

For instance, during the air-conditioner 300 is in the air-conditioning state (see FIG. 10), the unit controller 381 is configured to acquire the temperature of the air which goes through the second heat exchanger, the temperature of the outside air and the temperature of the air in the predetermined space 220. The unit controller 381 controls the airflow regulator 350 to switch the operation state from the air-conditioning state to the heat-reclaiming standard state (see FIG. 7) if the acquired temperature is higher than or equal to the supercritical temperature of the carbon dioxide refrigerant flowing in the second heat exchanger. The value of the supercritical temperature of the carbon may be stored in the memory of the unit controller 381 in advance.

<Control of Air-Pressure Balance>

In addition, the unit controller 381 may be configured to control the airflow regulator 350 such that the air-pressure balance in the air-conditioner 30 is maintained to a predetermined balance. The air pressure in the predetermined space 220 may be maintained higher than or equal to the air pressure of the outside 230 in order to prevent the outside air from coming into the predetermined space 220 via a door, a window or the like.

Figure 14:
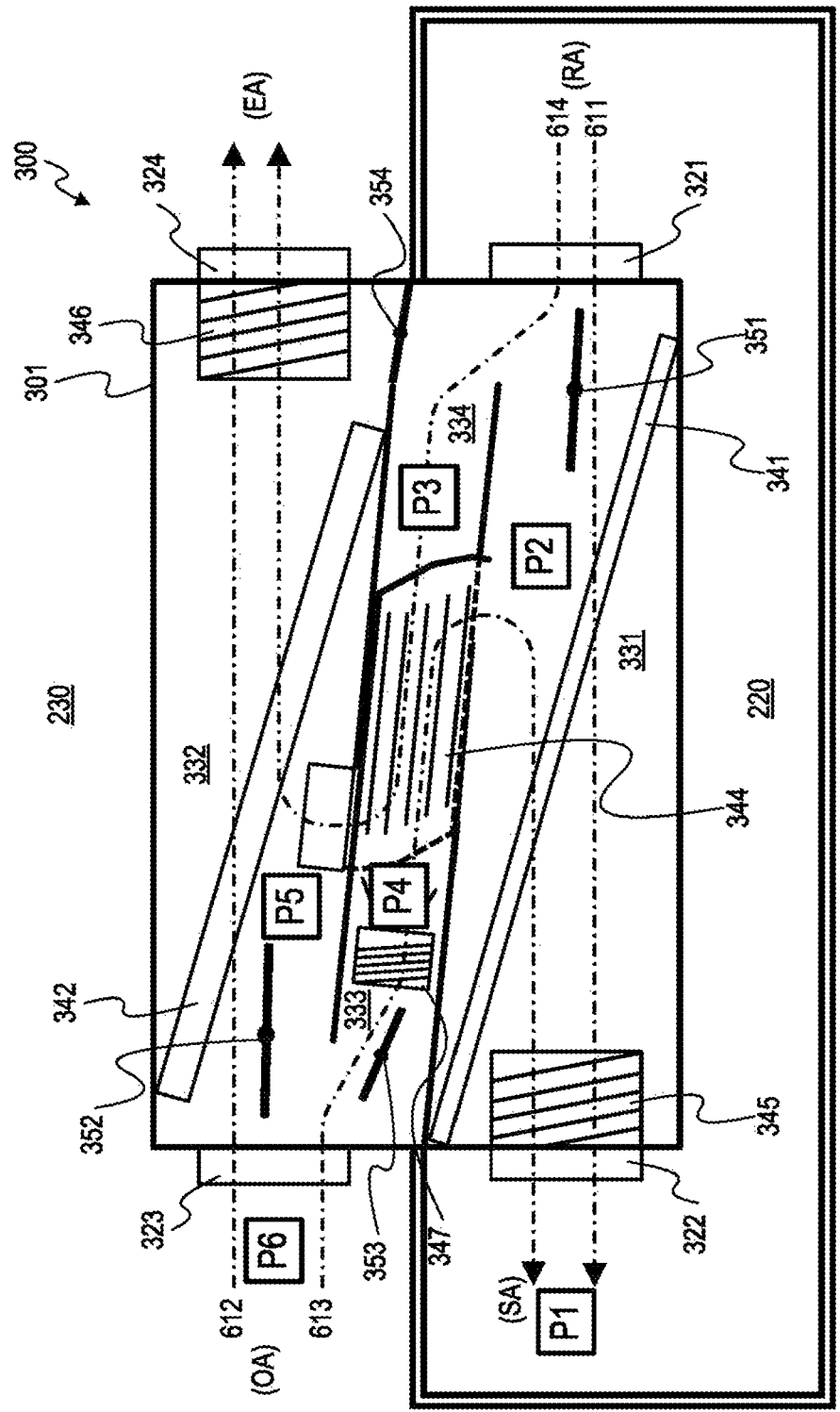
FIG. 14 is a schematic diagram for explaining pressure balances in the air-conditioner and the surround thereof.

FIG. 14 is a schematic diagram for explaining pressure balances in the air-conditioner 300 and the surround thereof.

Here, first to sixth pressures P1 to P6 are defined for explaining the above air-pressure balance. The first pressure P1 is a value of an air pressure in the predetermined space 220, e.g. on the right downstream side of the supply-air outlet 322. The second pressure P2 is a value of an air pressure in the first main air channel 331, e.g. on the right upstream side of the first heat exchanger 341. The third pressure P3 is a value of an air pressure in the exhaust ventilation channel 334, e.g. on the right upstream side of the total heat exchanger 344. The fourth pressure P4 is a value of an air pressure in the supply ventilation channel 333, e.g. on the right upstream side of the total heat exchanger 344. The fifth pressure P5 is a value of an air pressure in the second main air channel 332, e.g. on the right upstream side of the second main heat exchanger 342. The sixth pressure P6 is a value of an air pressure in the outside 230, e.g. on the right upstream side of the outside-air inlet 323.

The air-conditioner 300 is configured to maintain an air-pressure balance in which the first pressure P1 is higher than any one of the second to sixth pressures P2 to P6, the fourth and sixth pressures P4, P6 are higher than any one of the second, third and fifth pressures P2, P3, P5, and the second and third pressures P2, P3 are higher than the fifth pressure P5.

The unit controller 381 may control the rotation speed of each of the first fan 345, the second fan 346 and the third fan 347 and the rotation angle of each of the first main damper 351, the second main damper 352, the second sub damper 353 and the exhaust bypass damper 354 so as to achieve the above air-pressure balance. For this, the air-conditioner 300 may have a plurality of air-pressure sensors.

<Operation of Air-Conditioner>

Figure 15:
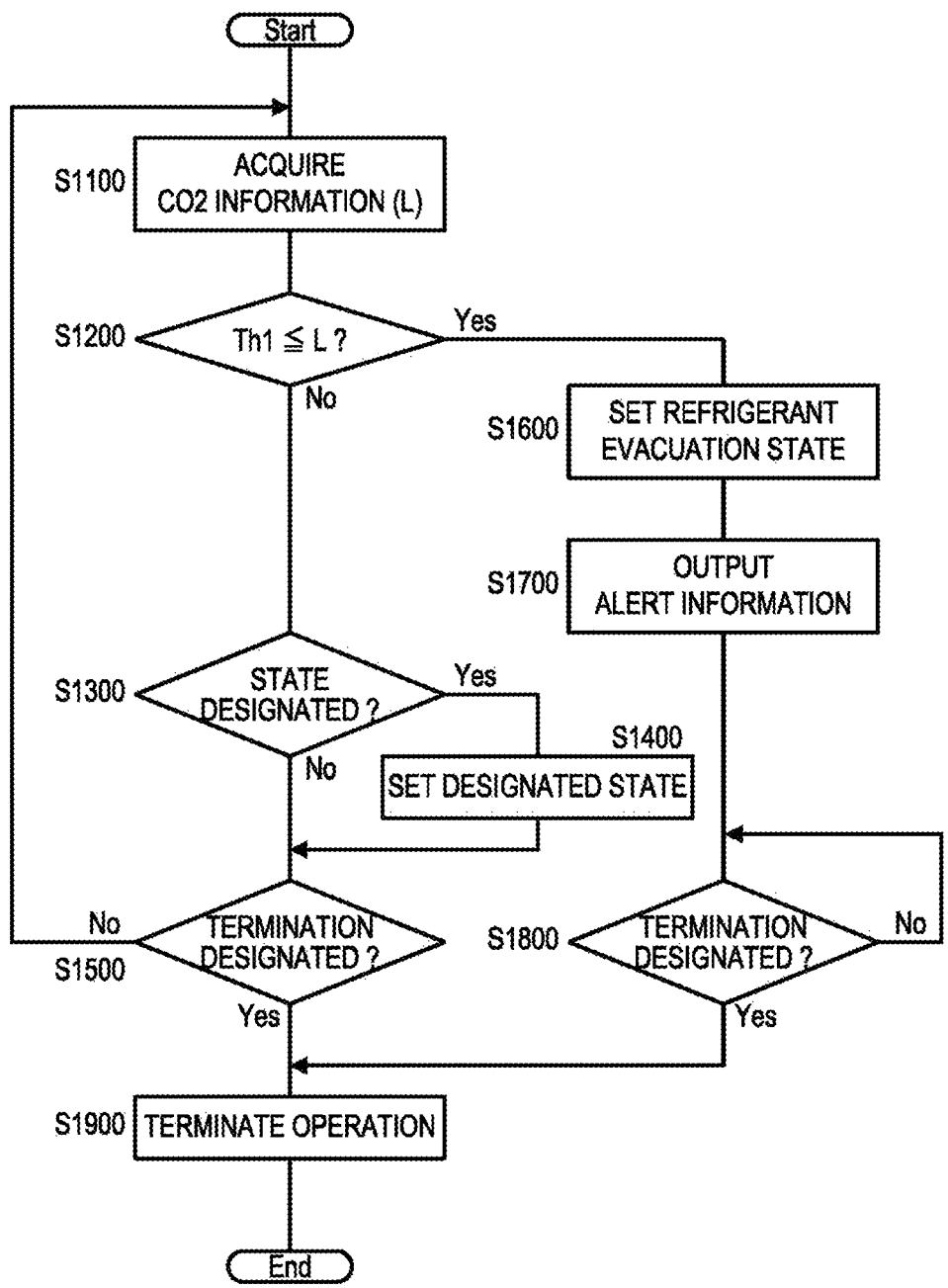
FIG. 15 is a flow chart indicating processes performed by the air-conditioner.

FIG. 15 is a flow chart indicating processes performed by the air-conditioner 300. The processes are executed by the unit controller 381 (see FIG. 6).

In a step S1100, the unit controller 381 acquires a CO2 information indicating the carbon dioxide level L in the predetermined space 220 from the room CO2 sensor 510. The unit controller 381 may send a request to the room CO2 sensor 510 and then receive the CO2 information as a reply, and/or passively receive the CO2 information that is sent by the room CO2 sensor 510 regularly.

In a step S1200, the unit controller 381 determines whether the carbon dioxide level L is higher than or equal to the first predetermined threshold Th1. If the carbon dioxide level L is lower than the first threshold Th1 (S1200: No), the unit controller 381 proceeds to a step S1300. If the carbon dioxide level L is higher than or equal to the first threshold Th1 (S1200: Yes), the unit controller 381 proceeds to a step S1600 explained later.

In the step S1300, the unit controller 381 determines whether an operation state has been designated. One of the above-mentioned operation states may be designated. The designation may be made by a user operation, another device, or the unit controller 381 itself according to the above-mentioned conditions. If an operation state has been designated (S1300: Yes), the unit controller 381 proceeds to a step S1400. If any operation state has not been designated (S1300: No), the unit controller 381 proceeds to a step S1500 explained later.

In the step S1400, the unit controller 381 sets the designated operation state to the air-conditioner 300. More specifically, the unit controller 381 controls the first fan 345, the second fan 346, the third fan 347, the airflow regulator 350 and the refrigerant regulator 374 such that the designated operation state is achieved.

In the step S1500, the unit controller 381 determines whether a termination of the operation by the unit controller 381 has been designated. The designation may be made by a user operation, another device, or the unit controller 381 itself. If the termination of the operation has not been designated (S1500: No), the unit controller 381 proceeds back to the step S1100. If the termination of the operation has been designated (S1500: Yes), the unit controller 381 proceeds to the step S1900 explained later.

In the step S1600, i.e. when the carbon dioxide level L is higher than or equal to the first threshold Th1, the unit controller 381 sets the refrigerant-evacuation state to the air-conditioner 300. More specifically, the unit controller 381 controls the first fan 345, the second fan 346, the third fan 347, the airflow regulator 350 and the refrigerant regulator 374 such that the refrigerant-evacuation state is achieved.

In a step S1700, the unit controller 381 outputs the alert information.

In a step S1800, the unit controller 381 determines whether a termination of the operation in the refrigerant-evacuation state has been designated. The designation may be made by a user operation, another device, or the unit controller 381 itself. If the termination of the operation has not been designated (S1800: No), the unit controller 381 repeats the determination in the step S1800. If the termination of the operation has been designated (S1800: Yes), the unit controller 381 proceeds to the step S1900.

In a step S1900, the unit controller 381 terminates its operation.

Advantageous Effect

As described above, the air-conditioner 300 according to one or more embodiments has the exhaust ventilation channel 334 configured to allow the ventilation exhaust air 614 to pass through the second heat exchanger 342, 343. The difference between temperature of air passing through the second heat exchanger 342, 343 and temperature of the refrigerant flowing in the second heat exchanger 342, 343 is increased by utilizing the ventilation exhaust air 614. Thus, performance of the air-conditioner 300 can be improved with a simple structure.

In addition, the air-conditioner 300 according to one or more embodiments has the unit 381 configured to acquire the CO2 information indicating a carbon dioxide level in the predetermined space 220 to be air-conditioned and/or ventilated by the air-conditioner 300, and control at least the first fan 345 and the second fan 346 according to the CO2 information. Thereby, it is possible to prevent that the carbon dioxide level becomes high in the space to be air-conditioned and/or ventilated by the air-conditioner even when, for instance, a leakage of the carbon dioxide refrigerant is occurred.

<Variations>

The configuration of the air-conditioner 300 and the air-conditioning system 100 according to the embodiments explained above may be modified. Some examples of such modifications are mentioned below. The each of modification examples may be combined with one or more of the other modification examples.

<Variations in Air Paths>

The air-conditioner 300 may have further one or more of channels configured to allow air to flow therein, additionally to or instead of one or more of the above-mentioned channels.

For instance, the air-conditioner 300 may be configured to prevent the ventilation exhaust air 614 from passing through both the total heat exchanger 344 and the second heat exchanger more actively.

Figure 16:
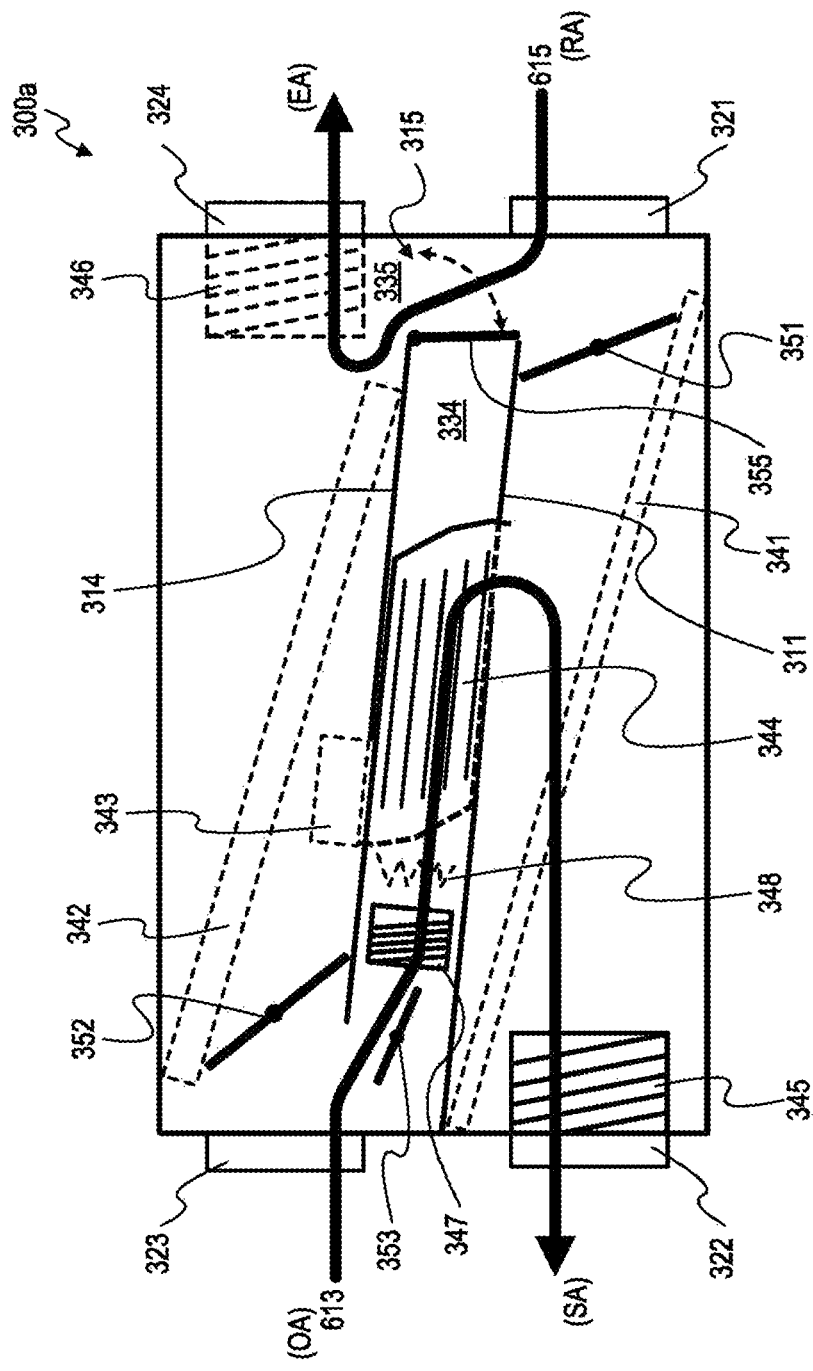
FIG. 16 is a schematic diagram indicating a schematic configuration of a first variation of the air-conditioner.

FIG. 16 is a schematic diagram indicating a schematic configuration of a first variation of the air-conditioner 300. The air-conditioner 300a as the first variation of the air-conditioner 300 may have substantially the same features as the air-conditioner 300 except for the features explained below.

The air-conditioner 300a has an exhaust switching damper (an exhaust damper) 355 which is a motor damper and controlled by the unit controller 381, instead of the exhaust bypass damper 354 (see FIG. 3). The exhaust switching damper 355 is disposed between the inner aperture 315 and the above-mentioned space formed between the RA separator 311 and the EA separator 314. The exhaust switching damper 355 is a part of the airflow regulator 350 (see FIG. 6).

The exhaust switching damper 355 is configured to rotate between a first angle and a second angle, as indicated by the dashed arrow in FIG. 16. The first angle is an angle at which the inner aperture 315 is closed by the exhaust switching damper 355 while the above-mentioned space is open with respect to the return-air inlet 321. The second angle is an angle at which the inner aperture 315 is open while the above-mentioned space is closed by the exhaust switching damper 355 with respect to the return-air inlet 321. Thus, the exhaust switching damper 355 is configured to switch the air path through which the ventilation exhaust air 614 primarily flows between the second air paths of the total heat exchanger 344 and the inner aperture 315. In other words, the exhaust switching damper 355 is configured to switch whether the ventilation exhaust air 614 goes through the second heat exchanger 342, 343.

For instance, during a cooling operation, the unit controller 381 is configured to acquire the temperature of the outside air, and determine whether a predetermined condition is met that the temperature of the outside air is higher than or equal to a predetermined threshold value. The unit controller 381 controls the exhaust switching damper 355 to close the inner aperture 315 if the above condition is met. Thereby, the ventilation exhaust air 614 goes through the total heat exchanger 344 and the second main heat exchanger 342. Meanwhile, the unit controller 381 controls the exhaust switching damper 355 to open the inner aperture 315 if the above condition is not met. Thereby, the ventilation exhaust air 614 is prevented from going through the total heat exchanger 344 and the second main heat exchanger 342. This state is substantially the same as the free-cooling state explained above by referring FIG. 12.

The air-conditioner 300 may also be configured to allow the ventilation exhaust air 614 to pass through the second heat exchanger while preventing from passing through the total heat exchanger 344.

Figure 17:
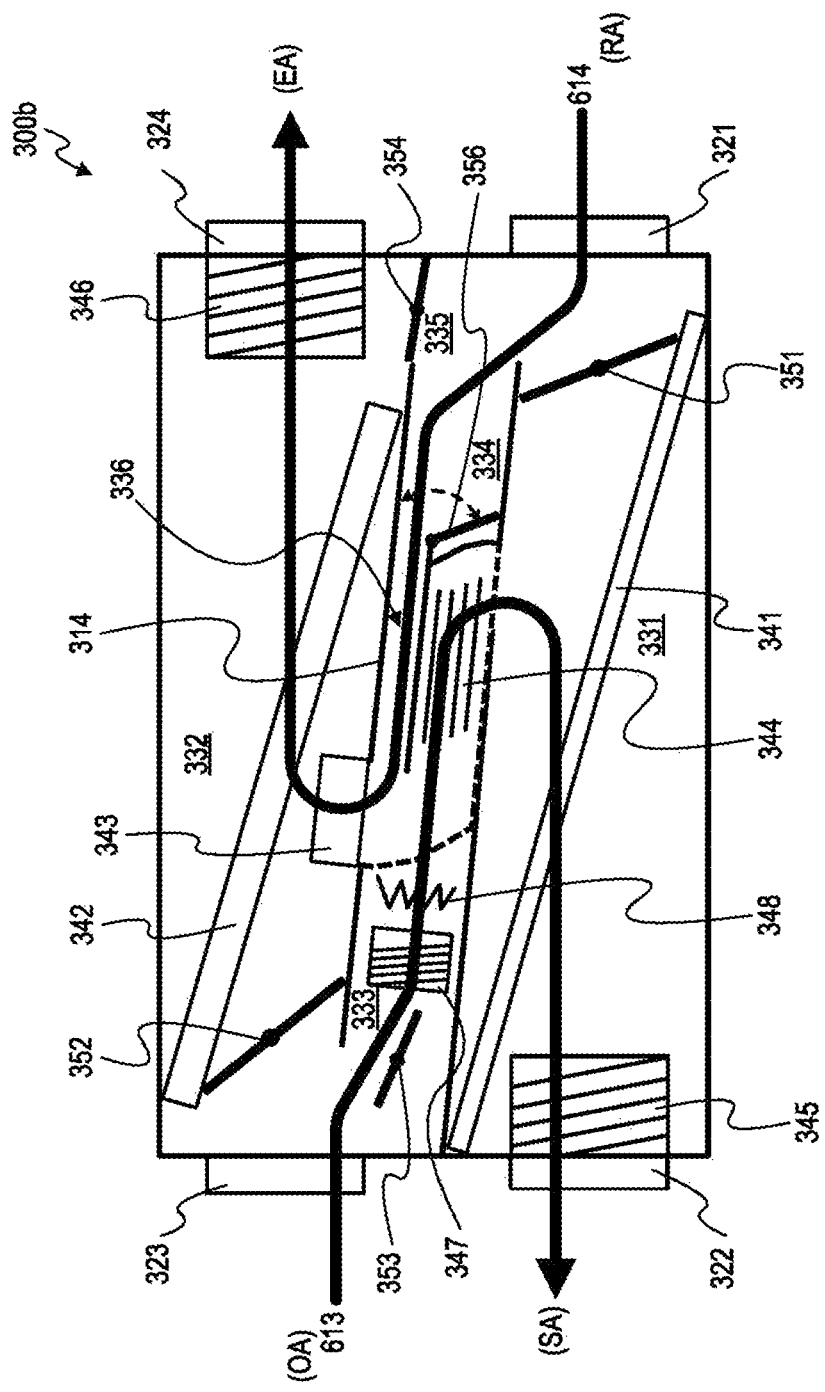
FIG. 17 is a schematic diagram indicating a schematic configuration of a second variation of the air-conditioner.

FIG. 17 is a schematic diagram indicating a schematic configuration of a second variation of the air-conditioner 300. The air-conditioner 300b as the second variation of the air-conditioner 300 may have substantially the same features as the air-conditioner 300 except for the features explained below.

The air-conditioner 300b has a semi-bypass channel 336. The semi-bypass channel 336 is formed substantially in parallel with the second air paths of the total heat exchanger 344. The semi-bypass channel 336 may be formed by the EA separator 314 and the outer surface of the total heat exchanger 344 therebetween. The semi-bypass channel 336 is configured to allow air to flow therein from the return-air inlet 321 towards the exhaust-air outlet 324 without passing through the total heat exchanger 344.

An end of the semi-bypass channel 336 may be positioned between the point where the exhaust bypass channel 335 diverges from the exhaust ventilation channel 334 and the second air paths of the total heat exchanger 344. Another end of the semi-bypass channel 336 may be positioned between the second air paths of the total heat exchanger 344 and the second sub heat exchanger 343. Thereby, the semi-bypass channel 336 allows the ventilation exhaust air 614 to pass through the second sub heat exchanger 343 and the second main heat exchanger 342 without passing through the total heat exchanger.

The air-conditioner 300b has a first switching damper (an exhaust damper) 356 which is a motor damper and controlled by the unit controller 381. The first switching damper 356 is disposed at the point where the semi-bypass channel 336 diverges from the exhaust ventilation channel 334. The first switching damper 356 is a part of the airflow regulator 350 (see FIG. 6).

The first switching damper 356 is configured to rotate between a first angle and a second angle, as indicated by the dashed arrow in FIG. 17. The first angle is an angle at which the semi-bypass channel 336 is closed by the first switching damper 356 and the second air paths of the total heat exchanger 344 is open with respect to the return-air inlet 321. The second angle is an angle at which the semi-bypass channel 336 is open and the second air paths of the total heat exchanger 344 is closed by the first switching damper 356 with respect to the return-air inlet 321. Thus, the first switching damper 356 is configured to switch the air path through which the ventilation exhaust air 614 primarily flows between the second air paths of the total heat exchanger 344 and the semi-bypass channel 336.

For instance, during a cooling operation, the unit controller 381 is configured to acquire the temperature of the refrigerant flowing in the second main heat exchanger 342, and determine whether the acquired temperature is higher than or equal to a predetermined threshold value. The unit controller 381 controls the first switching damper 356 to close the second air paths of the total heat exchanger 344 if the acquired temperature is higher than or equal to the predetermined threshold value. Thereby, the ventilation exhaust air 614 goes through the semi-bypass channel 336 and the second main heat exchanger 342. Meanwhile, the unit controller 381 controls the first switching damper 356 to close the semi-bypass channel 336 if the acquired temperature is lower than the predetermined threshold value. Thereby, the ventilation exhaust air 614 goes through the total heat exchanger 344 and the second main heat exchanger 342. Hence, it is possible to effectively decrease the temperature of the refrigerant flowing in the second sub heat exchanger 343 and the second main heat exchanger 342 as necessary.

The unit controller 381 may also be configured to control the first switching damper 356 to close the second air paths of the total heat exchanger 344 when it has been detected that the total heat exchanger 344 is malfunctioning or predicted to malfunction due to freezing, clogging or the like.

Alternatively, the air-conditioner 300 may be configured to allow the ventilation exhaust air 614 to pass through the total heat exchanger 344 while preventing from passing through the second heat exchanger.

Figure 18:
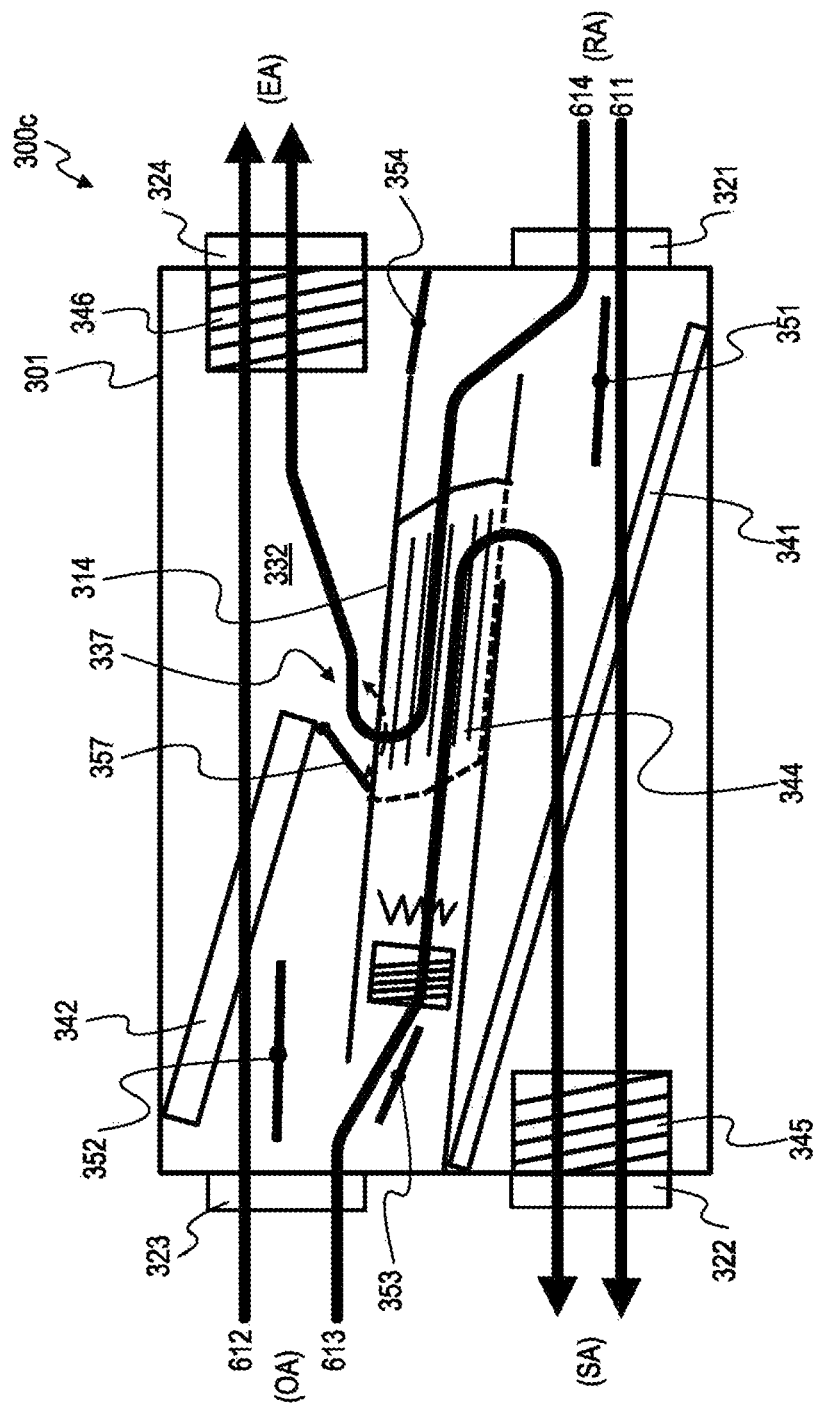
FIG. 18 is a schematic diagram indicating a schematic configuration of a third variation of the air-conditioner.

FIG. 18 is a schematic diagram indicating a schematic configuration of a second variation of the air-conditioner 300. The air-conditioner 300c as the third variation of the air-conditioner 300 may have substantially the same features as the air-conditioner 300 except for the features explained below.

The air-conditioner 300c has a semi-bypass aperture 337. With this configuration, the second sub heat exchanger 343 may be omitted. The semi-bypass aperture 337 is formed between the second main heat exchanger 342 and the EA separator 314. Thus, the cross-section of the second main air channel 332 along the second main heat exchanger 342 is divided into at least a region which is filled by the second main heat exchanger 342 and another region (i.e. the semi-bypass aperture 337) which is not filled by the second heat exchanger. The semi-bypass aperture 337 is configured to allow air to flow therein from the second air paths of the total heat exchanger 344 towards the exhaust-air outlet 324 without passing through the second main heat exchanger 342.

The air-conditioner 300c has a second switching damper (an exhaust damper) 357 which is a motor damper and controlled by the unit controller 381. The second switching damper 357 is disposed between the second main heat exchanger 342 and the semi-bypass aperture 337. The second switching damper 357 is a part of the airflow regulator 350 (see FIG. 6).

The second switching damper 357 is configured to rotate between a first angle and a second angle, as indicated by the dashed arrow in FIG. 18. The first angle is an angle at which the semi-bypass aperture 337 is closed by the second switching damper 357 and the second main heat exchanger 342 is open with respect to the second air paths of the total heat exchanger 344. The second angle is an angle at which the semi-bypass aperture 337 is open and the second main heat exchanger 342 is closed by the second switching damper 357 with respect to the second air paths of the total heat exchanger 344. Thus, the second switching damper 357 is configured to switch the air path through which the ventilation exhaust air 614 primarily flows between the second main heat exchanger 342 and the semi-bypass aperture 337. In other words, the second switching damper 357 is configured to switch whether the ventilation exhaust air 614 that has been passed through the total heat exchanger 344 goes through the second main heat exchanger 342.

For instance, during a cooling operation, the unit controller 381 is configured to acquire the temperature of the outside air, and determine whether the temperature of the outside air is higher than or equal to a predetermined threshold value. The unit controller 381 controls the second switching damper 357 to close the semi-bypass aperture 337 if the temperature of the outside air is higher than or equal to the predetermined threshold value. Thereby, the ventilation exhaust air 614 goes through the second main heat exchanger 342. Meanwhile, the unit controller 381 controls the second switching damper 357 to open the semi-bypass aperture 337 if the temperature of the outside air is lower than the predetermined threshold value. Thereby, the ventilation exhaust air 614 is prevented from going through the second main heat exchanger 342.

As another variation of the air-conditioner 300, the positional relationship of the return-air inlet 321, the supply-air outlet 322, the outside-air inlet 323 and the exhaust-air outlet 324 (i.e. the arrangement of the first main air channel 331, the second main air channel 332, the supply ventilation channel 333, the exhaust ventilation channel 334 and the exhaust bypass channel 335) may be modified from the positional relationship explained above.

Figure 19:
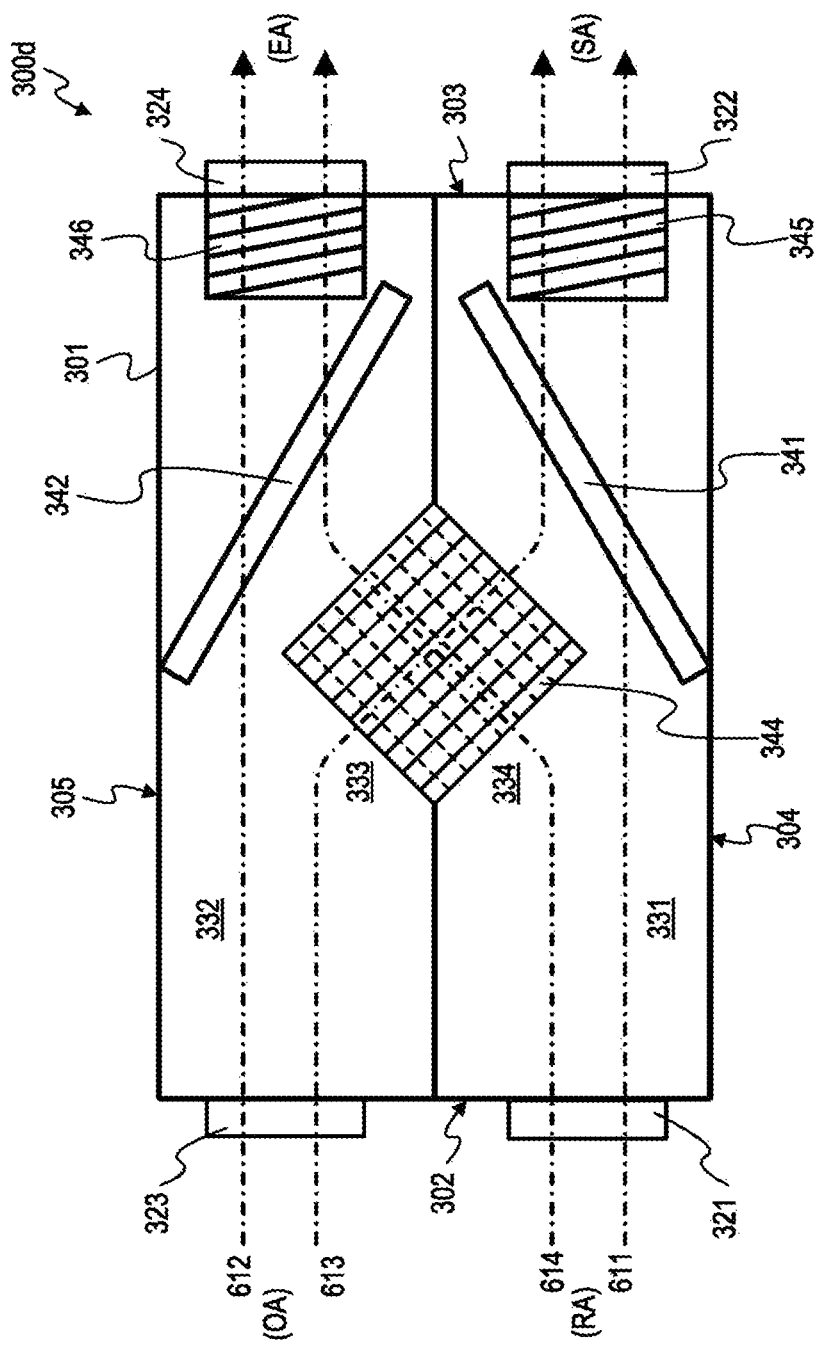
FIG. 19 is a schematic diagram indicating a schematic configuration of a fourth variation of the air-conditioner.

FIG. 19 is a schematic diagram indicating a schematic configuration of a fourth variation of the air-conditioner 300. The air-conditioner 300d as the fourth variation of the air-conditioner 300 may have substantially the same features as the air-conditioner 300 except for the features explained below.

In the air-conditioner 300d, the return-air inlet 321 and the outside-air inlet 323 are arranged on the same first face 302 of the housing 301, and the supply-air outlet 322 and the exhaust-air outlet 324 are arranged on the same second face 303. In other words, the first main air channel 331 and the second main air channel 332 are arranged substantially in parallel while being configured such that a direction from the return-air inlet 321 to the supply-air outlet 322 and a direction from the outside-air inlet 323 to the exhaust-air outlet 324 are substantially the same.

In such a configuration, as shown in FIG. 19, the first heat exchanger 341 and the second main heat exchanger 342 may be arranged such that an air-passing direction of the first heat exchanger 341 and an air-passing direction of the second main heat exchanger 342 are inclined with respect to each other. The first heat exchanger 341 and the second main heat exchanger 342 may be arranged so as to sandwich the total heat exchanger 344 therebetween.

As further another variation of the air-conditioner 300, the supply ventilation channel 333 and the exhaust ventilation channel 334 may be arranged substantially in parallel and configured such that a direction from the outside-air inlet 323 to the supply-air outlet 322 and a direction from the return-air inlet 321 to the exhaust-air outlet 324 are substantially opposite.

It is also possible to make the direction from the outside-air inlet 323 to the supply-air outlet 322 and the direction from the return-air inlet 321 to the exhaust-air outlet 324 substantially the same.

The positional relationship of the second main heat exchanger 342 and the exhaust ventilation channel 334 is not limited to the positional relationship explained above. For instance, the second main heat exchanger 342 may be arranged so as to allow the second passing air 612 to pass therethrough and arranged so as to prevent the ventilation exhaust air 614 from passing therethrough.

Figure 20:
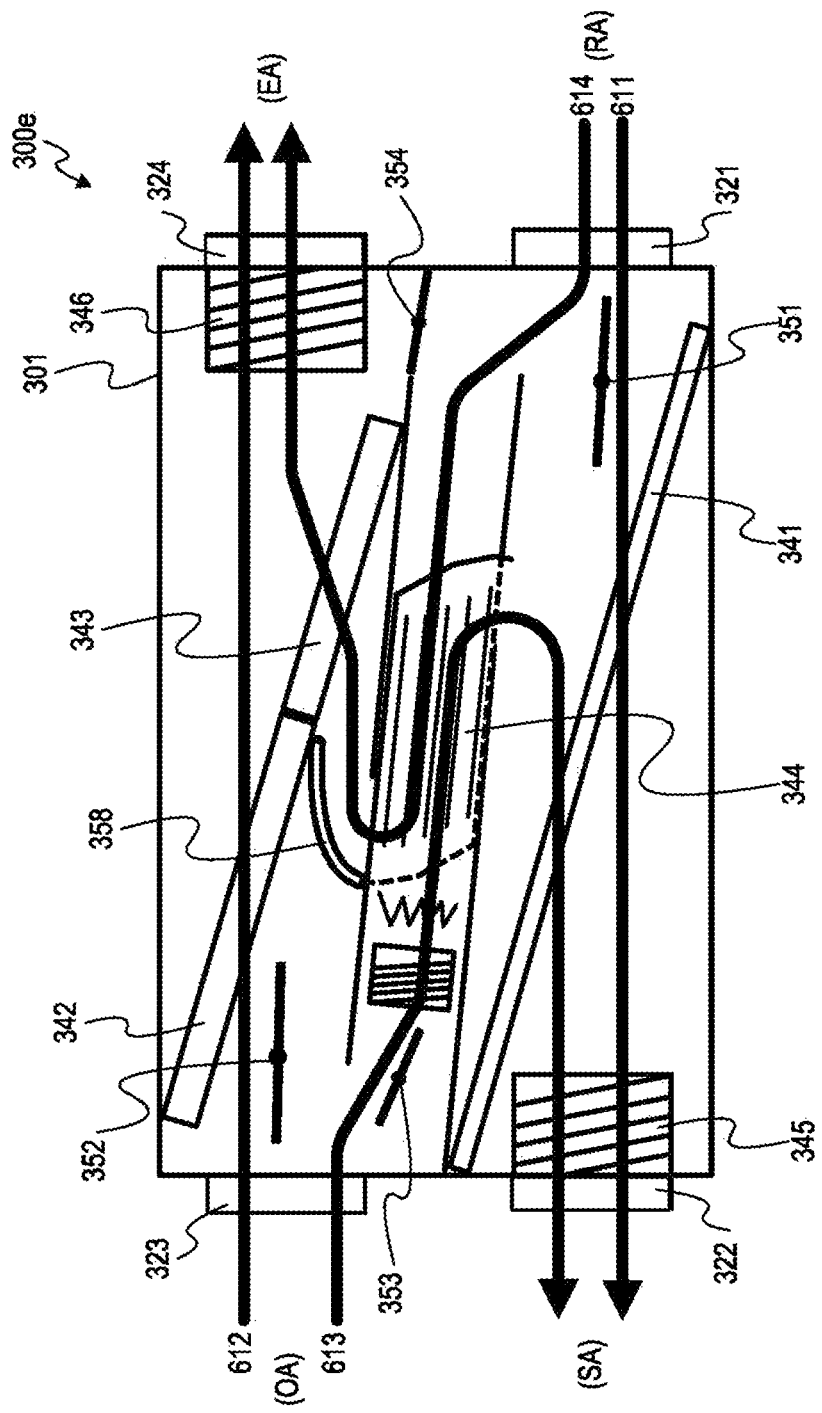
FIG. 20 is a schematic diagram indicating a schematic configuration of a fifth variation of the air-conditioner.

FIG. 20 is a schematic diagram indicating a schematic configuration of a fifth variation of the air-conditioner 300.

The air-conditioner 300e as the fifth variation of the air-conditioner 300 may have substantially the same features as the air-conditioner 300 except for the features explained below.

In the air-conditioner 300e, the second main heat exchanger 342 and the second sub heat exchanger 343 form a plate-like shape. The exhaust ventilation channel 334 has a separation plate 358. The separation plate 358 separates a space where air is drawn to the second main heat exchanger 342 and the second sub heat exchanger 343 into a main space and a sub space. The main space is a space where air is drawn to the second main heat exchanger 342. The sub space is a space where air is drawn to the second sub heat exchanger 343.

In this configuration, the separation plate 358 separates the second main air channel 332 and the exhaust ventilation channel 334 on an upstream side of the second main heat exchanger 342 and the second sub heat exchanger 343 so as to prevent the ventilation exhaust air 614 from passing through the second main heat exchanger 342.

<Variations in Unit Arrangement>

As further another variation of the air-conditioner 300, a part of the air-conditioner 300 may be separated from the rest part of the air-conditioner 300. For instance, an indoor unit including the first main air channel 331 and the first heat exchanger 341 and an outdoor unit including the second main air channel 332 and the second main heat exchanger 342 can be arranged separately.

Figure 21:
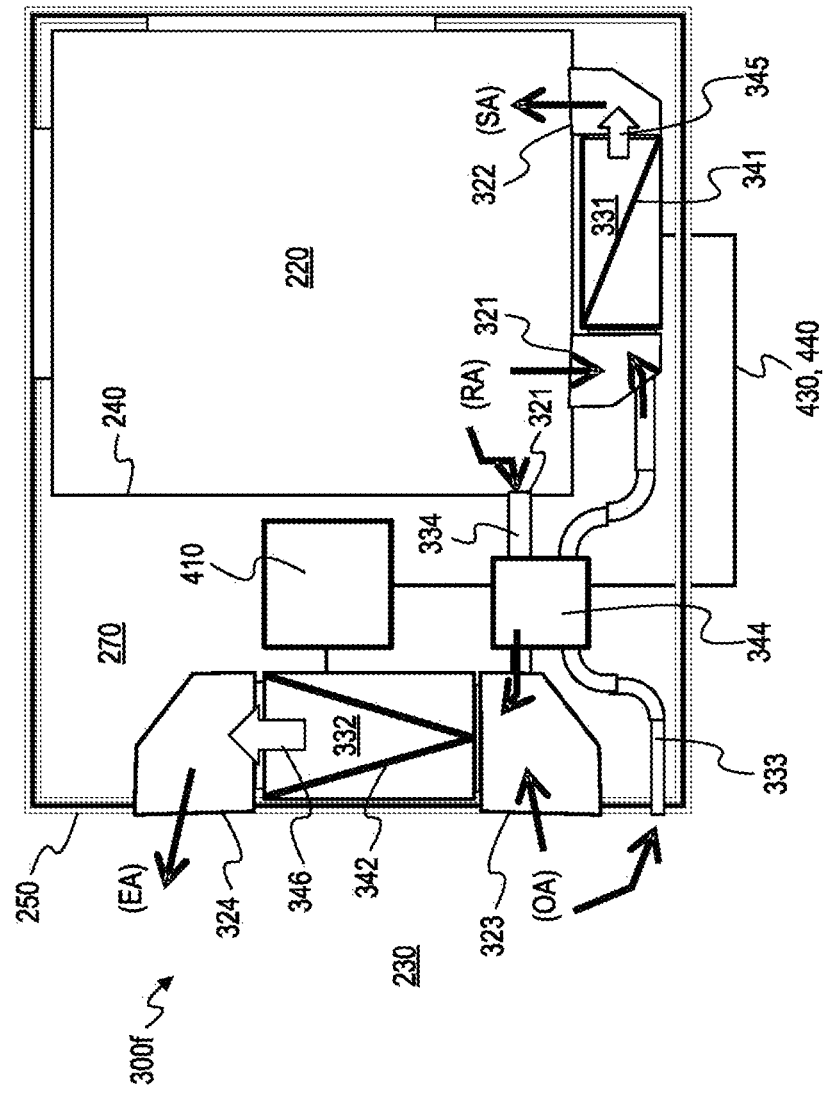
FIG. 21 is a schematic diagram indicating a schematic configuration of a sixth variation of the air-conditioner.

FIG. 21 is a schematic diagram indicating a schematic configuration of a sixth variation of the air-conditioner 300. The air-conditioner 300f as the sixth variation of the air-conditioner 300 may have substantially the same features as the air-conditioner 300 except for the features explained below.

In the air-conditioner 300f, the first main air channel 331, the second main air channel 332, and the total heat exchanger 344 are separated from each other. These channels are connected by a plurality of ducts. Thus, a part of the supply ventilation channel 333 and a part of the exhaust ventilation channel are formed by the ducts. The compressor unit 410 may be arranged in the rear wall space 270 as shown in FIG. 21.

As further another option, for instance, the unit controller 381 may be disposed in the compressor unit 410 and integrated with the system controller 412 (see FIG. 6). In this case, this integrated controller is configured to communicate with the first fan 345, the second fan 346, the third fan 347, the airflow regulator 350, the refrigerant regulator 374 and/or the release valve 420 to control them by a wired communication and/or a wireless communication.

In any case, the controller may be configured to control the state of at least one of the air-conditioners 300 between the cooling mode connection state and the heating mode connection state, allowing the at least one of the air-conditioners 300 to be in one of the cooling mode connection state and the heating mode connection state, while another one of the air-conditioners 300 is in another one of the cooling mode connection state and the heating mode connection state.

<Variations in System Arrangement>

As further another variation of the air-conditioner 300, the refrigerant circuit may be separated between the air-conditioners 300 and/or between the first heat exchanger 341 and the second main heat exchanger 342. For instance, a four-pipe system can be employed instead of the two-pipe system as shown in FIG. 5.

Figure 22:
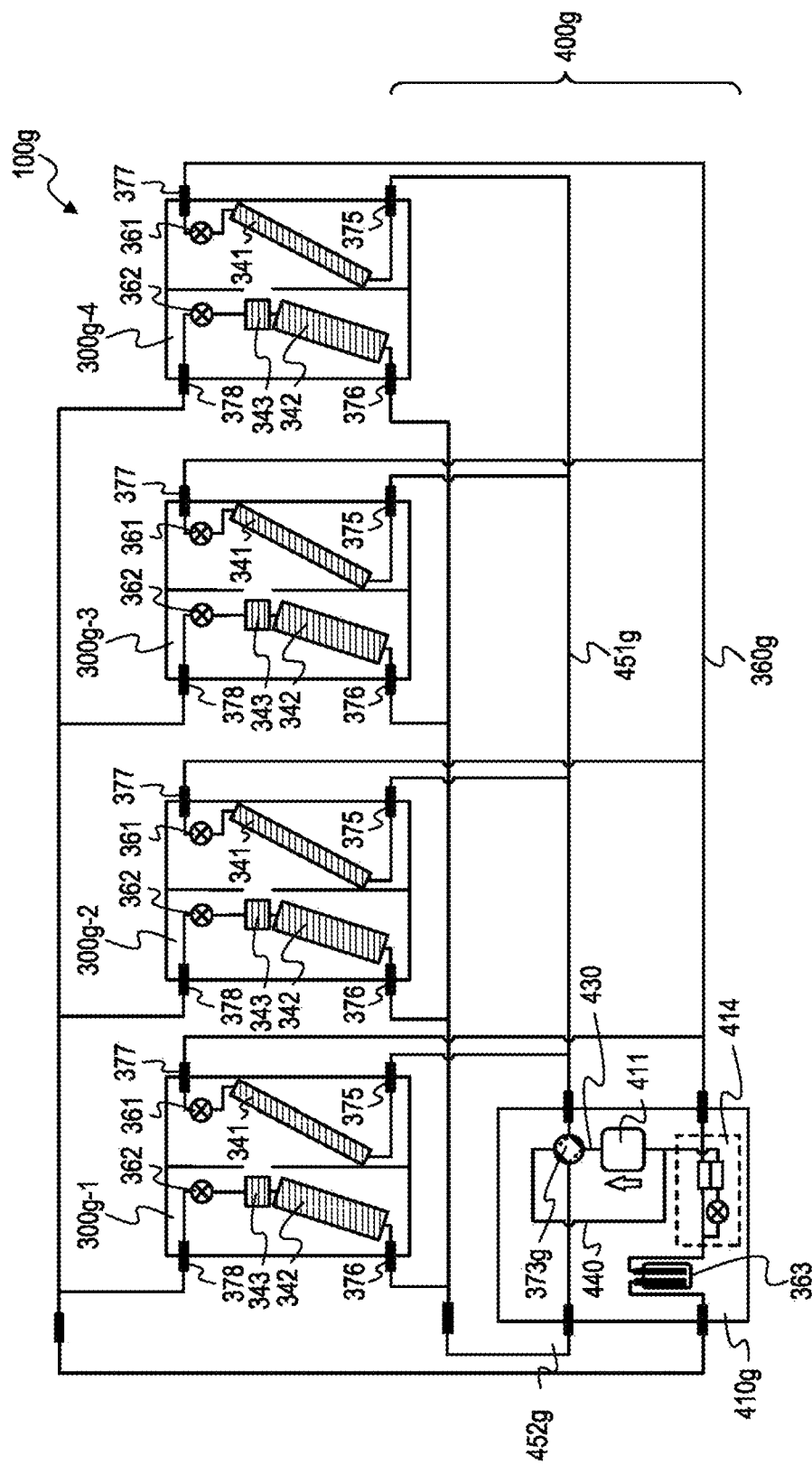
FIG. 22 is a schematic piping diagram of a variation of the air-conditioning system.

FIG. 22 is a schematic diagram indicating a schematic configuration of a variation of the air-conditioning system 100. The air-conditioning system 100g as the variation of the air-conditioning system 100 may have substantially the same features as the air-conditioning system 100 except for the features explained below.

In the air-conditioning system 100g, each air-conditioner 300g does not have the liquid refrigerant pipe 360 directly connecting the first heat exchanger 341 and the second heat exchanger 342, 343 and the four-way valve 373 (see FIGS. 4 and 5). Instead, the air-conditioning system 100g has a liquid refrigerant pipe 360g in the outside of the air-conditioners 300g, and a four-way valve 373g as a switching mechanism in the compressor unit 410g. In other words, the liquid refrigerant pipe 360g and the four-way valve 373g is disposed in the refrigerant compressor system 400e. Since the four-way valve 373 is not mounted on the air-conditioners 300g, it is possible to free the air-conditioners 300g from the noise caused by the four-way valve 373.

Moreover, each air-conditioner 300g has a first gas refrigerant port 375, a second gas refrigerant port 376, a first liquid refrigerant port 377 and a second liquid refrigerant port 378, instead of the high-pressure gas refrigerant port 371 and the low-pressure gas refrigerant port 372 (see FIGS. 4 and 5).

The first gas refrigerant port 375 and the first liquid refrigerant port 377 are connected to the first heat exchanger 341 on the opposite sides thereof. The second gas refrigerant port 376 and the second liquid refrigerant port 378 are connected to the second heat exchanger 342, 343 on the opposite sides thereof.

One end of the liquid refrigerant pipe 360g is branched towards and connected to the first heat exchangers 341 of the air-conditioners 300g. More specifically, the one end of the liquid refrigerant pipe 360g is connected to each of the first liquid refrigerant ports 377 of the air-conditioners 300g. Another side of the liquid refrigerant pipe 360g is branched towards and connected to the second heat exchangers 342 of the air-conditioners 300g. More specifically, the other end of the liquid refrigerant pipe 360g is connected to each of the second liquid refrigerant ports 378 of the air-conditioners 300g. Thus, the first heat exchangers 341 of the air-conditioners 300g, the liquid refrigerant pipe 360g, and the second heat exchangers 342 of the same air-conditioners 300g is connected in series in this order.

In the liquid refrigerant pipe 360g, at least one expansion valve is disposed. The first expansion valve 361 may be disposed between the first liquid refrigerant port 377 and the first heat exchanger 341 of each air-conditioner 300g, and the second expansion valve 362 may be disposed between the second liquid refrigerant port 378 and the second heat exchanger 342, 343 of each air-conditioner 300g. However, it is also possible to dispose, instead of the first expansion valves 361 and the second expansion valves 362, only one expansion valve in a part through which the refrigerant circulating each of all the air-conditioners 300g passes.

The air-conditioning system 100g further has a first gas refrigerant pipe 451g and a second gas refrigerant pipe 452g. The first gas refrigerant pipe 451g is branched towards and connected to the first heat exchangers 341 of the air-conditioners 300g. More specifically, the first gas refrigerant pipe 451g is connected to each of the first gas refrigerant ports 375 of the air-conditioners 300g. The second gas refrigerant pipe 452g is branched towards and connected to the second heat exchangers 342, 343 of the air-conditioners 300g. More specifically, the second gas refrigerant pipe 452g is connected to each of the second gas refrigerant ports 376 of the air-conditioners 300g. The release valve 420 may be provided to the liquid refrigerant pipe 360g (not shown in FIG. 22).

The high-pressure gas refrigerant pipe 430 and the low-pressure gas refrigerant pipe 440 are arranged in the compressor unit 410g. The four-way valve 373g is connected to each of the high-pressure gas refrigerant pipe 430, the low-pressure gas refrigerant pipe 440, the first gas refrigerant pipe 451g and the second gas refrigerant pipe 452g. The four-way valve 373g is configured to switch the states of the air-conditioners 300 between the cooling mode connection state and the heating mode connection state. The operation of the four-way valve 373g is controlled by the system controller 412 (see FIG. 6).

At least a part of the liquid refrigerant pipe 360g may be arranged in the compressor unit, 410g. In this case, the receiver 363 may be disposed in this part. In addition, the compressor unit 410g may further have a sub-cooling heat exchanger 414.

The sub-cooling heat exchanger 414 is fluidly connected to the liquid refrigerant pipe liquid refrigerant pipe. The sub-cooling heat exchanger 414 configured to cool down the refrigerant flowing in the liquid refrigerant pipe. More specifically, the sub-cooling heat exchanger 414 has a bypass pipe diverges from the liquid refrigerant pipe 360g and merges with the low-pressure gas refrigerant pipe 440. The bypass pipe has an expansion valve and a refrigerant heat exchanger in this order along the flow direction of the refrigerant from the liquid refrigerant pipe 360g to the low-pressure gas refrigerant pipe 440. The refrigerant heat exchanger causes a heat exchange between the refrigerant flowing in the liquid refrigerant pipe 360g and the refrigerant flowing in the bypass pipe after the expansion valve.

The temperature of the refrigerant decreases when passing through this expansion valve. Hence, the refrigerant flowing in the liquid refrigerant pipe 360g is cooled down at the refrigerant heat exchanger. Moreover, a part of the refrigerant flowing in the liquid refrigerant pipe 360g diverges towards the suction side of the refrigerant compressor 411, and thus does not flow into the air-conditioners 300g. Thus, this configuration makes it possible to improve the heat exchange efficiency in the first heat exchanger 341 or the second heat exchanger 342, 343 functioning as an evaporator, and/or reduce the mass flow of the refrigerant in the evaporator while maintaining the heat exchange efficiency in the evaporator.

In any configuration of the air-conditioning system 100 explained above, the compressor unit 410 may have a plurality of the refrigerant compressors 411. In this case, each of the high-pressure gas refrigerant pipe 430 and the low-pressure gas refrigerant pipe 440 may be branched towards and connected to the refrigerant compressors 411. In this case, the plurality of refrigerant compressors 411 are shared by the plurality of air-conditioners 300.

The components of the compressor unit 410, the high-pressure gas refrigerant pipe 430, and the low-pressure gas refrigerant pipe 440 may be integrated with one or more of the air-conditioners 300 within the housing 301 or another housing.

<Other Variations>

Needless to say, the application of the air-conditioner 300 is not limited to the application explained above. For instance, the air-conditioner 300 can be installed in a compound including a plurality of spaces to be air-conditioned and/or ventilated.

The refrigerant used in the air-conditioning systems above is not limited to the carbon dioxide refrigerant. For instance, R410A, R134a, R32 or any other refrigerant may be used in the air-conditioning system 100.

The number and/or arrangement of each of the air-conditioner 300, the compressor unit 410 and other components of the air-conditioning system 100 is not limited to the number and/or arrangement explained above. For instance, a plurality of the air-conditioners 300 may be arranged for the same space. The air-conditioner 300 may be disposed in the ceiling, in the space to be air-conditioned and/or ventilated, or in the outside in an exposed state.

Of course, the number and/or arrangement of each components of the air-conditioner 300 is not limited to the number and/or arrangement explained above. For instance, the first heat exchanger 341 and the second main heat exchanger 342 may be arranged such that the air-passing directions thereof substantially correspond with the extending directions of the first main air channel 331 and the second main air channel 332, respectively.

Obviously, one or more of the components and the air channels of the air-conditioner 300 may be omitted or replaced with other components that have substantially identical functions. For instance, the total heat exchanger 344, the second sub heat exchanger 343, the third fan 347, the electrical pre-heater 348, and/or the inner aperture 315 (and the exhaust bypass damper 354) may be omitted. In a case where one or more of power sources, such as air fans, that induce the necessary airflows in the air-conditioner 300 are provided outside the air-conditioner 300, the first fan 345, the second fan 346, and/or the third fan 347 may be omitted. The four-way valve 373 may be replaced with a mechanism having a first pair of pipes branched from a first pipe, a second pair of pipes branched from a second pipe, and four valves disposed in the branched four pipes, respectively.

Components not particularly specified in the above descriptions may be added. For instance, as an exhaust damper disposed in the exhaust ventilation channel 334, an exhaust main damper which is a motor damper and different from the exhaust bypass damper 354 may be arranged. The exhaust main damper may be arranged between the return-air inlet 321 and the total heat exchanger 344, and configured to regulate a flow of at least a part of the ventilation exhaust air 614 that passes through the total heat exchanger 344.

The operation performed by the air-conditioner 300 is not limited to the operation explained above. For instance, the air-conditioner 300 may be configured to perform only a part of the above explained operation states. The conditions for switching the operation state is also not limited to the conditions explained above.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 100, 100g: Air-Conditioning System
200: Building
210: Machine Space
220: Predetermined Space
230: Outside
240: Inner Wall
241: RA Suction Grill 242: SA Discharge Grill
243: Inspection Door
250: Outer Wall
251: OA Suction Grill
252: EA Discharge Grill
261: Ceiling Slab
262: Floor Slab
270: Rear Wall Space
300, 300a, 300b, 300c, 300d, 300e, 300f, 300g: Air-Conditioner
301: Housing
302: First Face
303: Second Face
304: Third Face
305: Fourth Face
311: RA Separator
312: SA Separator
313: OA Separator
314: EA Separator
315: Inner Aperture
316: First Separator Unit
317: Second Separator Unit
321: Return-Air Inlet
322: Supply-Air Outlet
323: Outside-Air Inlet
324: Exhaust-Air Outlet
331: First Main Air Channel
332: Second Main Air Channel
333: Supply Ventilation Channel
334: Exhaust Ventilation Channel
335: Exhaust Bypass Channel
336: Semi-bypass Channel
337: Semi-bypass Aperture
341: First Heat Exchanger
342: Second Main Heat Exchanger (Second Heat Exchanger)
343: Second Sub Heat Exchanger (Second Heat Exchanger)
344: Total Heat Exchanger
345: First Fan
346: Second Fan
347: Third Fan
348: Electrical Pre-Heater
350: Airflow Regulator
351: First Main Damper
352: Second Main Damper
353: Second Sub Damper
354: Exhaust Bypass Damper (Exhaust Damper)
355: Exhaust Switching Damper (Exhaust Damper)
356: First Switching Damper (Exhaust Damper)
357: Second Switching Damper (Exhaust Damper)
358: Separation Plate
360, 360g: Liquid Refrigerant Pipe
361: First Expansion Valve
362: Second Expansion Valve
363: Receiver
370: Pipe Connecting Mechanism
371: High-Pressure Gas Refrigerant Port
372: Low-Pressure Gas Refrigerant Port
373, 373g: Four-Way Valve (Switching Mechanism)
374: Refrigerant Regulator
375: First Gas Refrigerant Port
376: Second Gas Refrigerant Port
377: First Liquid Refrigerant Port
378: Second Liquid Refrigerant Port
381: Unit Controller (Controller)
400, 400g: Refrigerant Compressor System
410, 410g: Compressor Unit
411: Refrigerant Compressor
412: System Controller (Controller)
413: System Storage
414: Sub-Cooling Heat Exchanger
420: Release Valve
430: High-Pressure Gas Refrigerant Pipe
440: Low-Pressure Gas Refrigerant Pipe
451g: First Gas Refrigerant Pipe
452g: Second Gas Refrigerant Pipe
510: Room CO2 Sensor
511: Machine Space CO2 Sensor
611: First Passing Air
612: Second Passing Air
613: Ventilation Intake Air
614: Ventilation Exhaust Air
615: Exhaust Bypass Air

PATENT LITERATURE

[PATENT LITERATURE 1] EP 0091643 A2

The invention claimed is:
1. An air-conditioner, comprising:
a return-air inlet and a supply-air outlet each communicating with a predetermined space that is to be air-conditioned;
a first main air channel that allows air to flow in the first main air channel towards the supply-air outlet;
a first heat exchanger disposed in the first main air channel and that causes heat-exchange between carbon dioxide refrigerant flowing in the first heat exchanger and air passing through the first heat exchanger;
an exhaust-air outlet and an outside-air inlet each communicating with an outside of the predetermined space;
a second main air channel that allows air that is taken in through the outside-air inlet and discharged through the exhaust-air outlet to flow in the second main air channel towards the exhaust-air outlet;
a second heat exchanger disposed in the second main air channel and that causes heat-exchange between carbon dioxide refrigerant flowing in the second heat exchanger and air passing through the second heat exchanger;
an airflow regulator that regulates flow of:
  a first passing air that:
    is taken in through the return-air inlet and discharged through the supply-air outlet, and
    passes through the first heat exchanger,
  a second passing air that:
    is taken in through the outside-air inlet and discharged through the exhaust-air outlet, and
    passes through the second heat exchanger,
  a ventilation intake air that:
    is taken in through the outside-air inlet and discharged through the supply-air outlet, and
    passes through the first heat exchanger, and
  a ventilation exhaust air that:
    is taken in through the return-air inlet and discharged through the exhaust-air outlet, and
    passes through the second heat exchanger;
an exhaust ventilation channel that allows the ventilation exhaust air to flow in the exhaust ventilation channel; and
a unit controller configured to control the airflow regulator such that an air-conditioning state is switched to a heat reclaiming standard state in response to a temperature of air that goes through the second heat exchanger being higher than or equal to a supercritical temperature of the carbon dioxide refrigerant flowing in the second heat exchanger, wherein in the air-conditioning state, the airflow regulator causes the first passing air and the second passing air to flow and the ventilation intake air and the ventilation exhaust air to not flow, and in the heat reclaiming standard state, the airflow regulator causes all of the first passing air, the second passing air, the ventilation intake air, and the ventilation exhaust air to flow.

2. The air-conditioner according to claim 1, wherein the second main air channel allows only the ventilation exhaust air to pass through the second heat exchanger.

3. The air-conditioner according to claim 1, wherein the exhaust ventilation channel allows the second passing air to be mixed with the ventilation exhaust air before the second passing air passes through the second heat exchanger.

4. The air-conditioner according to claim 1, further comprising:
a supply ventilation channel that allows air to flow in the supply ventilation channel from the outside-air inlet towards the supply-air outlet.

5. The air-conditioner according to claim 4, wherein
the supply ventilation channel allows the first passing air to be mixed with the ventilation intake air before the first passing air passes through the first heat exchanger.

6. The air-conditioner according to claim 4, further comprising:
a total heat exchanger that:
forms a part of the supply ventilation channel and a part of the exhaust ventilation channel, and
causes heat-exchange between the ventilation intake air and the ventilation exhaust air.

7. The air-conditioner according to claim 1, wherein the airflow regulator comprises:
a first main damper in the first main air channel;
a second main damper in the second main air channel; and
an exhaust damper in the exhaust ventilation channel.

8. The air-conditioner according to claim 1, wherein
the first heat exchanger causes an air-passing direction of the first heat exchanger to be inclined with respect to an extending direction of the first main air channel, and
the second heat exchanger causes an air-passing direction of the second heat exchanger to be inclined with respect to an extending direction of the second main air channel.

9. The air-conditioner according to claim 1, wherein
the first main air channel and the second main air channel are disposed in parallel, and
a direction from the return-air inlet to the supply-air outlet is opposite to a direction from the outside-air inlet to the exhaust-air outlet.

10. The air-conditioner according to claim 1, wherein
the first main air channel and the second main air channel are disposed in parallel, and
a direction from the return-air inlet to the supply-air outlet is parallel to a direction from the outside-air inlet to the exhaust-air outlet.

11. The air-conditioner according to claim 1, further comprising:
a supply ventilation channel that allows air to flow in the supply ventilation channel from the outside-air inlet towards the supply-air outlet, wherein
the supply ventilation channel and the exhaust ventilation channel are disposed in parallel, and
a direction from the outside-air inlet to the supply-air outlet is opposite to a direction from the return-air inlet to the exhaust-air outlet.

12. The air-conditioner according to claim 1, further comprising:
a supply ventilation channel that allows air to flow in the supply ventilation channel from the outside-air inlet towards the supply-air outlet, wherein
the supply ventilation channel and the exhaust ventilation channel are disposed in parallel, and
a direction from the outside-air inlet to the supply-air outlet is parallel to a direction from the return-air inlet to the exhaust-air outlet.

13. The air-conditioner according to claim 1, further comprising:
a piping that connects each of the first heat exchanger and the second heat exchanger to a refrigerant compressor via a high-pressure gas refrigerant pipe connected to a discharge side of the refrigerant compressor and a low-pressure gas refrigerant pipe connected to a suction side of the refrigerant compressor such that the first heat exchanger, the second heat exchanger, and the refrigerant compressor form a heat pump circuit.

14. The air-conditioner according to claim 1, wherein the airflow regulator switches whether the ventilation exhaust air goes through the second heat exchanger.

15. The air-conditioner according to claim 14, further comprising:
a controller that determines whether a predetermined condition is met that a temperature of an air drawn into the air-conditioner from the outside-air inlet is higher than or equal to a predetermined threshold value, wherein
the airflow regulator further regulates flows of the second passing air and the ventilation exhaust air such that:
the ventilation exhaust air to go through the second heat exchanger in response to the predetermined condition being met, and
the ventilation exhaust air to be prevented from going through the second heat exchanger in response to the predetermined condition being not met.

16. The air-conditioner according to claim 1, further comprising:
a supply ventilation channel that allows air to flow in the supply ventilation channel from the outside-air inlet towards the supply-air outlet; and
a total heat exchanger that:
forms a part of the supply ventilation channel and a part of the exhaust ventilation channel, and
causes heat-exchange between the ventilation intake air and the ventilation exhaust air, wherein
the airflow regulator switches whether the ventilation exhaust air that has been passed through the total heat exchanger goes through the second heat exchanger.

17. The air-conditioner according to claim 1, wherein the second heat exchanger comprises:
a main heat exchanger that causes heat-exchange between carbon dioxide refrigerant flowing in the main heat exchanger and air passing through the main heat exchanger; and
a sub heat exchanger disposed in the exhaust ventilation channel and that causes heat-exchange between carbon dioxide refrigerant flowing in the sub heat exchanger and air passing through the sub heat exchanger.

18. The air-conditioner according to claim 17, wherein carbon dioxide refrigerant that has flown through the main heat exchanger flows in the sub heat exchanger when the second heat exchanger functions as a condenser.

19. The air-conditioner according to claim 17, wherein the airflow regulator allows the ventilation exhaust air to pass through the sub heat exchanger and prevents the second passing air from passing through the sub heat exchanger.

20. The air-conditioner according to claim 17, wherein the sub heat exchanger and the main heat exchanger are disposed in series in this order along a direction of airflow of the ventilation exhaust air.

21. The air-conditioner according to claim 17, further comprising:
a supply ventilation channel that allows air to flow in the supply ventilation channel from the outside-air inlet towards the supply-air outlet; and
a total heat exchanger that:
forms a part of the supply ventilation channel and a part of the exhaust ventilation channel, and
causes heat-exchange between the ventilation intake air and the ventilation exhaust air, wherein
the total heat exchanger, the sub heat exchanger, and the main heat exchanger are disposed in series in this order along a direction of airflow of the ventilation exhaust air.

22. The air-conditioner according to claim 17, wherein the airflow regulator allows the second passing air to pass through the main heat exchanger and prevents the ventilation exhaust air from passing through the main heat exchanger.

23. The air-conditioner according to claim 22, wherein the main heat exchanger and the sub heat exchanger form a plate-like shape, and
the exhaust ventilation channel has a separation plate that separates a main space where air is drawn to the main heat exchanger from a sub space where air is drawn to the sub heat exchanger.

24. The air-conditioner according to claim 17, wherein the sub heat exchanger comes into contact with at least a part of the second passing air.

25. The air-conditioner according to claim 17, further comprising:
a supply ventilation channel that allows air to flow in the supply ventilation channel from the outside-air inlet towards the supply-air outlet; and
a total heat exchanger that:
forms a part of the supply ventilation channel and a part of the exhaust ventilation channel, and
causes heat-exchange between the ventilation intake air and the ventilation exhaust air, wherein
the sub heat exchanger is disposed on a downstream side of the total heat exchanger in a direction from the return-air inlet to the exhaust-air outlet.

26. The air-conditioner according to claim 1, further comprising:
a supply ventilation channel that allows air to flow in the supply ventilation channel from the outside-air inlet towards the supply-air outlet;
a total heat exchanger that:
forms a part of the supply ventilation channel and a part of the exhaust ventilation channel, and
causes heat-exchange between the ventilation intake air and the ventilation exhaust air; and
an electrical pre-heater disposed in the supply ventilation channel between the outside-air inlet and the total heat exchanger.

27. The air-conditioner according to claim 1, further comprising:
a housing accommodating the first main air channel, the second main air channel, and an exhaust ventilation channel;
a first fan configured to draw air in the housing towards the supply-air outlet; and
a second fan configured to draw air in the housing towards the exhaust-air outlet.

28. An air-conditioner, comprising:
a return-air inlet and a supply-air outlet each communicating with a predetermined space that is to be air-conditioned;
a first main air channel that allows air to flow in the first main air channel towards the supply-air outlet;
a first heat exchanger disposed in the first main air channel and that causes heat-exchange between carbon dioxide refrigerant flowing in the first heat exchanger and air passing through the first heat exchanger;
an exhaust-air outlet and an outside-air inlet each communicating with an outside of the predetermined space;
a second main air channel that allows air that is taken in through the outside-air inlet and discharged through the exhaust-air outlet to flow in the second main air channel towards the exhaust-air outlet;
a second heat exchanger disposed in the second main air channel and that causes heat-exchange between carbon dioxide refrigerant flowing in the second heat exchanger and air passing through the second heat exchanger;
an airflow regulator that regulates flow of:
a first passing air that:
is taken in through the return-air inlet and discharged through the supply-air outlet, and
passes through the first heat exchanger,
a second passing air that:
is taken in through the outside-air inlet and discharged through the exhaust-air outlet, and
passes through the second heat exchanger,
a ventilation intake air that:
is taken in through the outside-air inlet and discharged through the supply-air outlet, and
passes through the first heat exchanger, and
a ventilation exhaust air that:
is taken in through the return-air inlet and discharged through the exhaust-air outlet, and
passes through the second heat exchanger;
an exhaust ventilation channel that allows the ventilation exhaust air to flow in the exhaust ventilation channel and to pass through the second heat exchanger; and
a unit controller configured to control the airflow regulator such that an air-conditioning state is switched to a heat reclaiming standard state in response to a temperature of air that goes through the second heat exchanger being higher than or equal to a supercritical temperature of the carbon dioxide refrigerant flowing in the second heat exchanger, wherein
in the air-conditioning state, the airflow regulator causes the first passing air and the second passing air to flow and the ventilation intake air and the ventilation exhaust air to not flow, and
in the heat reclaiming standard state, the airflow regulator causes all of the first passing air, the second passing air, the ventilation intake air, and the ventilation exhaust air to flow,
the first heat exchanger causes carbon dioxide refrigerant to flow in the first heat exchanger, the second heat exchanger causes carbon dioxide refrigerant to flow in the second heat exchanger, and the airflow regulator reduces a temperature of air that goes through the second heat exchanger below a supercritical temperature of the carbon dioxide refrigerant flowing in the second heat exchanger by regulating a flow of the ventilation exhaust air.

29. An air-conditioner, comprising:

a return-air inlet and a supply-air outlet each communicating with a predetermined space that is to be air-conditioned;

a first main air channel that allows air to flow in the first main air channel from the return-air inlet towards the supply-air outlet;

a first heat exchanger disposed in the first main air channel and that causes heat-exchange between carbon dioxide refrigerant flowing in the first heat exchanger and air passing through the first heat exchanger;

an outside-air inlet and an exhaust-air outlet each communicating with an outside of the predetermined space;

a second main air channel that allows air that is taken in through the outside-air inlet and discharged through the exhaust-air outlet to flow in the second main air channel towards the exhaust-air outlet;

a second heat exchanger disposed in the second main air channel and that causes heat-exchange between carbon dioxide refrigerant flowing in the second heat exchanger and air passing through the second heat exchanger;

a supply ventilation channel that allows air to flow in the supply ventilation channel from the outside-air inlet towards the supply-air outlet;

an airflow regulator that regulates flow of:
  a first passing air that:
    is taken in through the return-air inlet and discharged through the supply-air outlet, and
    passes through the first heat exchanger,
  a second passing air that:
    is taken in through the outside-air inlet and discharged through the exhaust-air outlet, and
    passes through the second heat exchanger,
  a ventilation intake air that:
    is taken in through the outside-air inlet and discharged through the supply-air outlet, and
    passes through the first heat exchanger, and
  a ventilation exhaust air that:
    is taken in through the return-air inlet and discharged through the exhaust-air outlet, and
    passes through the second heat exchanger;

an exhaust ventilation channel that allows the ventilation exhaust air to flow in the exhaust ventilation channel;

a first fan that forms an air flow towards the supply-air outlet;

a second fan that forms an air flow towards the exhaust-air outlet; and a controller that acquires CO2 information indicating a carbon dioxide level in the predetermined space and controls the first fan and the second fan according to the CO2 information, wherein the controller is configured to control the airflow regulator such that an air-conditioning state is switched to a heat reclaiming standard state in response to a temperature of air that goes through the second heat exchanger being higher than or equal to a supercritical temperature of the carbon dioxide refrigerant flowing in the second heat exchanger, in the air-conditioning state, the airflow regulator causes the first passing air and the second passing air to flow and the ventilation intake air and the ventilation exhaust air to not flow, and in the heat reclaiming standard state, the airflow regulator causes all of the first passing air, the second passing air, the ventilation intake air, and the ventilation exhaust air to flow.

* * * * *